United States Patent
Loveland et al.

(10) Patent No.: US 11,731,762 B2
(45) Date of Patent: Aug. 22, 2023

(54) CRISSCROSS BOUSTROPHEDONIC FLIGHT PATTERNS FOR UAV SCANNING AND IMAGING

(71) Applicant: Loveland Innovations, Inc., Pleasant Grove, UT (US)

(72) Inventors: Jim Loveland, Alpine, UT (US); Leif Larson, Orem, UT (US); Dan Christiansen, Orem, UT (US); Tad Christiansen, Lehi, UT (US)

( * ) Notice: Subject to any disclaimer, the term of this patent is extended or adjusted under 35 U.S.C. 154(b) by 115 days.

(21) Appl. No.: 17/409,781

(22) Filed: Aug. 23, 2021

(65) Prior Publication Data
US 2021/0380239 A1  Dec. 9, 2021

Related U.S. Application Data

(63) Continuation of application No. 16/522,913, filed on Jul. 26, 2019, now Pat. No. 11,097,841, which is a
(Continued)

(51) Int. Cl.
| | |
|---|---|
| *B64C 39/02* | (2023.01) |
| *G08G 5/00* | (2006.01) |
| *G06T 17/05* | (2011.01) |
| *G01C 11/34* | (2006.01) |
| *G06T 7/00* | (2017.01) |
| *G06T 17/00* | (2006.01) |
| *G05D 1/02* | (2020.01) |

(Continued)

(52) U.S. Cl.
CPC ......... *B64C 39/024* (2013.01); *G05D 1/0094* (2013.01); *G05D 1/0202* (2013.01); *G06T 17/00* (2013.01); *H04N 23/60* (2023.01); *H04N 23/695* (2023.01); *B64U 10/10* (2023.01); *B64U 2101/30* (2023.01); *B64U 2201/10* (2023.01); *G06T 7/0002* (2013.01); *G06T 2207/10048* (2013.01); *G06T 2207/30184* (2013.01)

(58) Field of Classification Search
None
See application file for complete search history.

(56) References Cited

U.S. PATENT DOCUMENTS

| | | |
|---|---|---|
| 5,721,691 A | 2/1998 | Wuller |
| 6,037,945 A | 3/2000 | Loveland |

(Continued)

FOREIGN PATENT DOCUMENTS

| | | |
|---|---|---|
| WO | 2016/053438 | 4/2016 |
| WO | 2018/089268 | 5/2018 |
| WO | 2019/083791 | 5/2019 |

OTHER PUBLICATIONS

USPTO Non-final Office Action; U.S. Appl. No. 15/388,754; dated May 26, 2017, 12 pp.
(Continued)

*Primary Examiner* — Adam D Tissot
(74) *Attorney, Agent, or Firm* — PCFB, LLC; Justin K. Flanagan

(57) ABSTRACT

An unmanned autonomous vehicle assessment and reporting system may implement a boustrophedonic flight pattern for capturing images of a structure to develop a three-dimensional model of the same. A crisscross boustrophedonic flight pattern may include two or more boustrophedonic flight patterns that are at angles relative to one another.

12 Claims, 28 Drawing Sheets

Related U.S. Application Data continuation of application No. 16/035,888, filed on Jul. 16, 2018, now Pat. No. 10,364,027.

(60) Provisional application No. 62/576,640, filed on Oct. 24, 2017.

(51) Int. Cl.
   *G05D 1/00* (2006.01)
   *H04N 23/60* (2023.01)
   *H04N 23/695* (2023.01)
   *B64U 10/10* (2023.01)
   *B64U 101/30* (2023.01)

(56) References Cited

U.S. PATENT DOCUMENTS

| | | | |
|---|---|---|---|
| 6,810,383 B1 | 10/2004 | Loveland | |
| 6,816,819 B1 | 11/2004 | Loveland | |
| 6,826,539 B2 | 11/2004 | Loveland | |
| 6,829,584 B2 | 12/2004 | Loveland | |
| 7,363,157 B1 | 4/2008 | Hanna | |
| 7,447,564 B2 | 11/2008 | Yasukawa | |
| 7,868,812 B2 | 1/2011 | Huthoefer | |
| 8,078,436 B2 | 12/2011 | Pershing | |
| 8,159,662 B2 | 4/2012 | Rezac | |
| 8,170,840 B2 | 5/2012 | Pershing | |
| 8,209,152 B2 | 6/2012 | Pershing | |
| 8,229,768 B1 | 7/2012 | Hopkins, III | |
| 8,345,578 B2 | 1/2013 | Thoumy | |
| 8,346,578 B1 | 1/2013 | Hopkins, III et al. | |
| 8,380,349 B1 | 2/2013 | Hickman | |
| 8,473,125 B2 | 6/2013 | Rischmuller | |
| 8,542,880 B2 | 9/2013 | Thornberry | |
| 8,718,838 B2 | 5/2014 | Kokkeby | |
| 8,818,572 B1 | 8/2014 | Tofte | |
| 8,818,770 B2 | 8/2014 | Pershing | |
| 8,823,732 B2 | 9/2014 | Adams | |
| 8,825,454 B2 | 9/2014 | Pershing | |
| 9,036,861 B2 | 5/2015 | Chen | |
| 9,075,415 B2 | 7/2015 | Kugelmass | |
| 9,082,015 B2* | 7/2015 | Christopulos | G06V 20/176 |
| 9,098,655 B2 | 8/2015 | Plummer | |
| 9,116,003 B2 | 8/2015 | Khorashadi | |
| 9,129,376 B2 | 9/2015 | Pershing | |
| 9,135,737 B2 | 9/2015 | Pershing | |
| 9,152,863 B1 | 10/2015 | Grant | |
| 9,162,753 B1 | 10/2015 | Panto | |
| 9,162,762 B1* | 10/2015 | Tofte | G06V 20/176 |
| 9,201,422 B2 | 12/2015 | Ohtomo | |
| 9,251,417 B1 | 2/2016 | Xu | |
| 9,501,061 B2 | 11/2016 | Canoy | |
| 9,501,700 B2 | 11/2016 | Loveland | |
| 9,505,494 B1 | 11/2016 | Marlow | |
| 9,513,635 B1* | 12/2016 | Bethke | G05D 1/0094 |
| 9,563,201 B1 | 2/2017 | Tofte | |
| 9,609,288 B1 | 3/2017 | Richman | |
| 9,613,538 B1 | 4/2017 | Poole | |
| 9,618,940 B1 | 4/2017 | Michini | |
| 9,639,960 B1 | 5/2017 | Loveland | |
| 9,734,397 B1 | 8/2017 | Larson | |
| 9,805,261 B1 | 10/2017 | Loveland | |
| 9,805,489 B2 | 10/2017 | Schultz | |
| 9,823,658 B1 | 11/2017 | Loveland | |
| 9,836,882 B2 | 12/2017 | Freund | |
| 9,881,163 B2 | 1/2018 | Schultz | |
| 9,898,802 B2 | 2/2018 | Giuffrida | |
| 9,933,254 B2 | 4/2018 | Thornberry | |
| 9,953,112 B2 | 4/2018 | Schultz | |
| 9,959,609 B2 | 5/2018 | Giuffrida | |
| 9,959,653 B2 | 5/2018 | Schultz | |
| 9,959,667 B2 | 5/2018 | Schultz | |
| 9,972,126 B2 | 5/2018 | Freund | |
| 9,978,149 B1 | 5/2018 | Zhang | |
| 10,032,078 B2 | 7/2018 | Schultz | |
| 10,037,463 B2 | 7/2018 | Schultz | |
| 10,037,464 B2 | 7/2018 | Schultz | |
| 2002/0013644 A1 | 1/2002 | Mekemson | |
| 2002/0169664 A1 | 11/2002 | Walker | |
| 2003/0033242 A1 | 2/2003 | Lynch | |
| 2003/0210168 A1 | 11/2003 | Ruszkowski, Jr. | |
| 2004/0066917 A1 | 4/2004 | Yasukawa | |
| 2004/0167667 A1 | 8/2004 | Goncalves | |
| 2004/0167861 A1 | 8/2004 | Hedley | |
| 2004/0177373 A1 | 9/2004 | Kawabe et al. | |
| 2005/0267657 A1 | 12/2005 | Devdhar | |
| 2006/0133661 A1 | 6/2006 | Takeda | |
| 2007/0233367 A1 | 10/2007 | Chen | |
| 2009/0201190 A1 | 8/2009 | Huthoefer | |
| 2009/0265193 A1 | 10/2009 | Collins | |
| 2010/0215212 A1 | 8/2010 | Flakes | |
| 2010/0277588 A1 | 11/2010 | Ellsworth | |
| 2010/0277723 A1 | 11/2010 | Rezac | |
| 2012/0237083 A1 | 9/2012 | Lange | |
| 2013/0006448 A1 | 1/2013 | Callou | |
| 2013/0216089 A1 | 8/2013 | Chen | |
| 2013/0325244 A1 | 12/2013 | Wang | |
| 2014/0153773 A1 | 6/2014 | Gupta | |
| 2014/0168420 A1 | 6/2014 | Naderhirn | |
| 2014/0312165 A1 | 10/2014 | Mkrtchyan | |
| 2014/0316614 A1 | 10/2014 | Newman | |
| 2014/0316616 A1 | 10/2014 | Kugelmass | |
| 2014/0324405 A1 | 10/2014 | Plummer | |
| 2014/0336928 A1 | 11/2014 | Scott | |
| 2015/0019267 A1 | 1/2015 | Prieto | |
| 2015/0148955 A1 | 5/2015 | Chin | |
| 2015/0220085 A1 | 8/2015 | Ohtomo | |
| 2015/0225081 A1 | 8/2015 | Kespry | |
| 2015/0226575 A1 | 8/2015 | Rambo | |
| 2015/0348204 A1 | 12/2015 | Daues | |
| 2015/0371346 A1 | 12/2015 | Frendling | |
| 2015/0377405 A1 | 12/2015 | Down | |
| 2016/0004795 A1 | 1/2016 | Novak | |
| 2016/0148363 A1 | 5/2016 | Phan | |
| 2016/0246304 A1 | 8/2016 | Canoy | |
| 2016/0247115 A1 | 8/2016 | Pons | |
| 2016/0253808 A1* | 9/2016 | Metzler | B64C 39/02 382/103 |
| 2016/0257424 A1 | 9/2016 | Kespry | |
| 2016/0272308 A1 | 9/2016 | Gentry | |
| 2016/0292872 A1 | 10/2016 | Hammond | |
| 2016/0301859 A1 | 10/2016 | Tebay | |
| 2016/0307447 A1 | 10/2016 | Johnson | |
| 2016/0321503 A1 | 11/2016 | Zhou | |
| 2016/0327959 A1 | 11/2016 | Brown | |
| 2016/0347462 A1 | 12/2016 | Kespry | |
| 2016/0363929 A1 | 12/2016 | Kespry | |
| 2016/0365825 A1 | 12/2016 | Poivet | |
| 2016/0377424 A1 | 12/2016 | Clark | |
| 2017/0053169 A1 | 2/2017 | Cuban | |
| 2017/0090481 A1 | 3/2017 | Kespry | |
| 2017/0123035 A1 | 5/2017 | Kespry | |
| 2017/0146344 A1 | 5/2017 | Kespry | |
| 2017/0193829 A1 | 7/2017 | Bauer | |
| 2017/0249510 A1 | 8/2017 | Labrie | |
| 2017/0270612 A1 | 9/2017 | Howe | |
| 2017/0270650 A1 | 9/2017 | Howe | |
| 2017/0334559 A1* | 11/2017 | Bouffard | G08G 5/0034 |
| 2018/0218533 A1* | 8/2018 | Millin | G08G 5/006 |
| 2019/0118945 A1 | 4/2019 | Loveland | |

OTHER PUBLICATIONS

USPTO Non-final Office Action; U.S. Appl. No. 15/360,630; dated Apr. 13, 2017, 13 pp.

USPTO Non-final Office Action; U.S. Appl. No. 15/480,310; dated May 15, 2017, 15 pp.

USPTO Final Office Action; U.S. Appl. No. 15/444,164; dated Jul. 14, 2017, 19 pp.

USPTO Notice of Allowance; U.S. Appl. No. 15/360,630; dated Jun. 21, 2017, 8 pp.

USPTO Notice of Allowance; U.S. Appl. No. 15/360,641; dated Mar. 17, 2017, 16 pp.

(56) References Cited

OTHER PUBLICATIONS

USPTO Notice of Allowance; U.S. Appl. No. 15/388,754; dated Oct. 5, 2017, 10 pp.
Autonomous MAV—Cues, Cooper Bills et al., IEEE, 978-1-61284-385-8, 2011, pp. 5776-5783.
Unmanned—Monitoring, C. Eschmann et al., ResearchGate, 2012, pp. 1-8.
USPTO Final Office Action; U.S. Appl. No. 15/446,202; dated Nov. 8, 2017, 22 pp.
USPTO Non-final Office Action; U.S. Appl. No. 15/444,164; dated Apr. 21, 2017, 21 pp.
USPTO Non-final Office Action; U.S. Appl. No. 15/446,202; dated Jun. 28, 2017, 22 pp.
PCT Application No. PCT/US2017/059990, International Search Report dated Jan. 29, 2018, 2 pp.
PCT Application No. PCT/US2017/059990, Written Opinion dated Jan. 29, 2018, 4 pp.
U.S. Appl. No. 15/796,672, Non-Final Office Action dated Dec. 14, 2017, 16 pp.
U.S. Appl. No. 15/708,471, Non-Final Office Action dated Jan. 5, 2018, 7 pp.
U.S. Appl. No. 15/796,672, Final Office Action dated Jun. 25, 2018, 16 pp.
U.S. Appl. No. 15/446,202, Notice of Allowance dated Jul. 5, 2018, 11 pp.
U.S. Appl. No. 15/446,202, Non-Final Office Action dated Feb. 22, 2018, 9 pp.
PCT Application No. PCT/US2018/056338, International Search Report and Written Opinion dated Jan. 3, 2019, 10 pp.
U.S. Appl. No. 16/522,913, Non-Final Office Action dated Feb. 17, 2021, 10 pp.

* cited by examiner

Estimate

Type of Roofing: Asphalt Shingles
Total Square Footage: 1700
Total Damage Points: 33
Total Roof Faces: 4
Roof Faces Needing Replacement: 3
Square Footage Needing Replacement: 1275
Square Footage Needing Repair: 300
Average Damage: Moderate
Cost Per Square Foot: $7.00

Total Cost: $8925.00

( Back ) ( Calculate Tax ) ( View Insurance Login ) ( Continue to Payment )

FIG.16

CRISSCROSS BOUSTROPHEDONIC FLIGHT PATTERNS FOR UAV SCANNING AND IMAGING

RELATED APPLICATIONS

This application is a continuation of Non-Provisional application Ser. No. 16/522,913 filed on Jul. 26, 2019 titled "Crisscross Boustrophedonic Flight Patterns for UAV Scanning and Imaging," which is a continuation of Non-Provisional application Ser. No. 16/035,888 filed on Jul. 16, 2018 titled "Crisscross Boustrophedonic Flight Patterns for UAV Scanning and Imaging," which claims priority to Provisional Application No. 62/576,640 filed on Oct. 24, 2017, titled "Crisscross Boustrophedonic Flight Patterns for UAV Scanning and Imaging," all of which are hereby incorporated by reference in their entireties.

TECHNICAL FIELD

This disclosure generally relates to systems and methods for autonomous analyses, inspections, reporting, and remediation estimates for structures and other property. Specifically, this disclosure relates to real-time surface and subsurface analyses using autonomous vehicles (such as analyses of roof surfaces and/or subsurfaces), associated reporting systems, and associated visualization systems.

BRIEF DESCRIPTION OF THE DRAWINGS

Non-limiting and non-exhaustive embodiments of the disclosure are described herein, including various embodiments of the disclosure with reference to the figures listed below.

FIG. 16 illustrates an estimate of repairs based on patch scan analyses and a roof type analysis presented on an electronic computing device, according to various embodiments.

DETAILED DESCRIPTION

Figure 1A:
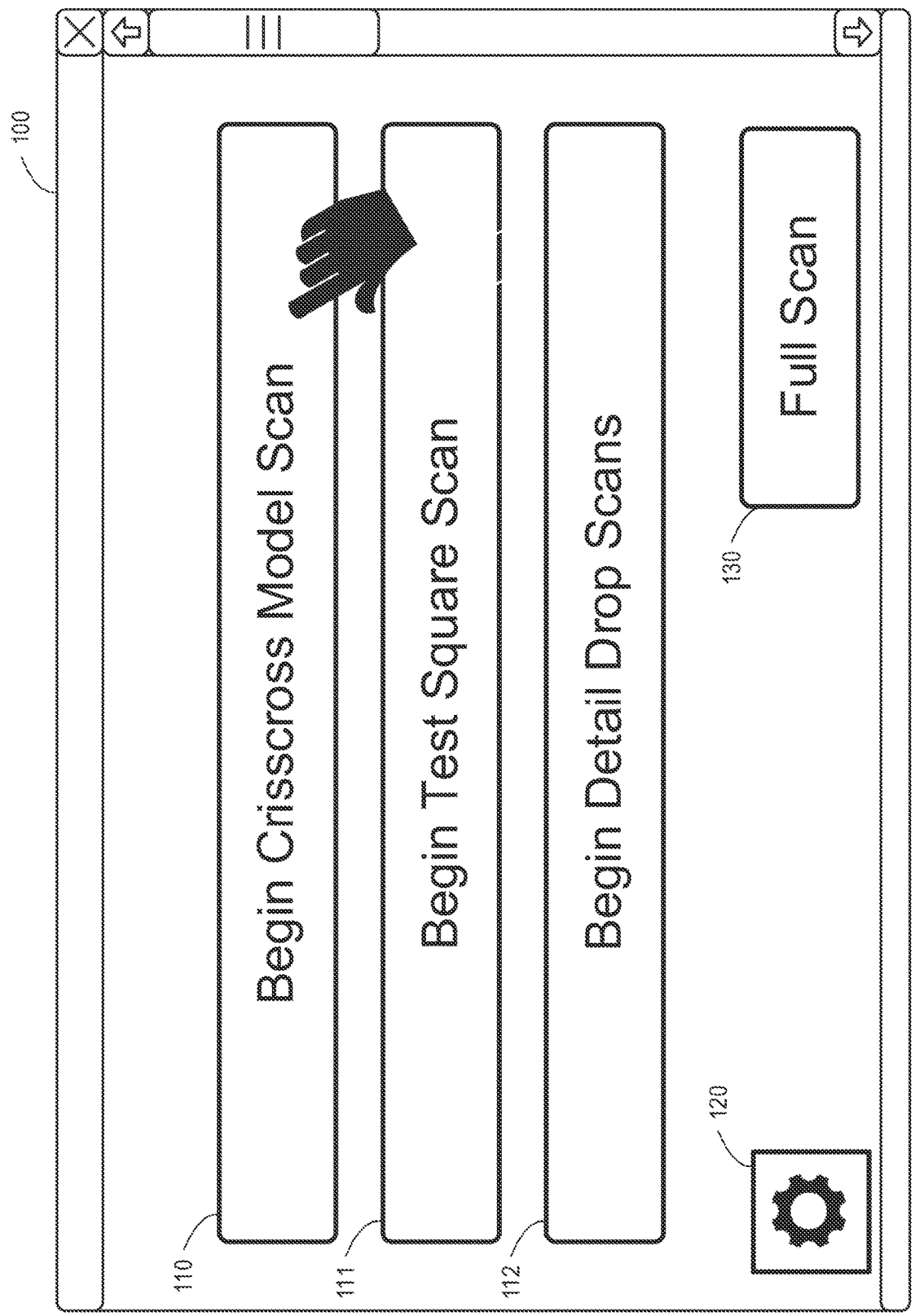
FIG. 1A illustrates an example of a user interface for initiating one of three scan types, including a crisscross scan, a test square scan, and a detail drop scan via an electronic computing device.

Roof damage assessment and remediation estimates generally require a human assessor to scale a ladder to examine a roof. The assessor may attempt to follow a set of guidelines during the assessment in an attempt to provide systematic and uniform reports and estimates. It is widely recognized that there is some subjectivity to these types of analyses and difficulty in producing uniform and objective results. For this reason, it is not uncommon to find that an agent of a roof repair company may report that there is more damage to a roof than an insurance adjuster might report. Uniformity in the assessment is difficult due to human biases and subjective analysis techniques.

The assessor may also have a difficult time showing an owner, or another interested person, what exactly is wrong with a roof. Photographs taken with handheld cameras from atop the roof are often devoid of context and lack sufficient detail to convey convincing or understandable evidence of damage, repair plans, etc., to an owner or another interested party. For example, a homeowner may find a photograph of a group of shingles devoid of the context necessary to draw their own conclusions. Similarly, a soft spot caused by water damage photographed using a handheld camera from on top of the roof may not convey sufficiently meaningful information to a party of interest because it lacks the context of the surrounding roof.

Moreover, the number and types of people that can act as agents, assessors, adjusters, etc. are limited because these individuals must be able to scale a ladder and perform a roof analysis. In many instances, this limits the number and types of people that can act as assessors and/or agents for owners, insurance companies, roofing companies, government analysts, and others that may have an interest in evaluating a roof. For example, while a person may be a good salesperson, insurance agent, or adjuster, if they are unwilling or incapable of scaling a ladder and walking around on a roof, they may not be able to perform the necessary tasks.

This disclosure provides methods and systems for assessing damage, defects, anomalies, identifying materials, determining various characteristics, and/or generally capturing images or other scan data on roofs of residential, commercial, and industrial buildings, including, but not limited to, single-family homes, condominiums, townhomes, office buildings, industrial buildings, sheds, storage units, and other structures with roofs on them. The systems and methods described herein for assessing damage on a roof include the use of autonomously controlled unmanned aerial vehicles (UAVs) to ensure that roof analyses are systematic and uniform. This disclosure also provides systems and methods for three-dimensional modeling, visualizing damage assessments (e.g., via patch scans of sample regions), determining roofing materials, and producing systematic and uniform remediation estimates.

A UAV may carry an imaging system to capture multiple images of the roof. The UAV may capture visible light images, infrared images, and/or ultraviolet images. Other sensor types may be used as well, including, but not limited to moisture sensors, ultrasonic sensors, LIDAR, RADAR, etc. False color representations may be generated for visualizing sensor data from non-visible spectrum image sensors. Thus, the term "image" is used broadly herein to include visible-spectrum images as well as 'images' captured using alternative sensor types, such as infrared, ultraviolet, and ultrasonic sensor systems.

The systems and methods described herein may be implemented by an owner of the roof or an agent of a company (including a representative, contractor, or employee thereof). Examples of companies that might utilize the systems and methods described herein include, but are not limited to, an insurance company, a roofing company, a damage assessment company, an inspector, a government analyst, an appraiser, or other property valuation, evaluation, assessment, or repair company.

In various embodiments, an agent may function as an operator of the UAV and utilize a remote-control system, such as a personal computer or personal electronic device. Examples of such devices include watches, tablets, laptops, smart glasses, wearable tech, and mobile phones. An operator may use the computing device to initiate an assessment via a software program. In some embodiments, the agent may use the software program to select a standard or default assessment, three-dimensional modeling, specific detail scans, etc. A settings menu may be used before or during a flight as well. For example, settings for a patch scan may be selected for a desired sample size (e.g., sample region dimensions for a patch scan analysis), and/or a desired scope of the assessment. In some embodiments, the operator may begin the UAV assessment by placing the UAV in a safe location for takeoff and selecting a "start" or "begin" icon on the computing device.

The UAV may be programmed to perform an analysis of the nearest roof or one or more roofs based on a selection by the operator. For instance, the operator may use satellite images or real-time nadir images from the UAV to select one or more structures having one or more roofs for the UAV to analyze.

In some embodiments, the UAV may initially position itself above the selected roof(s) to capture nadir images of the roof(s) and/or associated structures. In some embodiments, the nadir image may be used to align the UAV and/or scan data (e.g., captured images) with data available from another source (e.g., satellite images associated with GPS data). Examples of GPS offset alignment are described in U.S. Provisional Patent Application No. 62/501,326 titled "GPS Offset Calibration for UAVs" filed on May 15, 2017, which application is hereby incorporated by reference in its entirety. Additional examples of approaches for GPS offset alignment are described in U.S. Patent Application No. CURRENTLY UNKNOWN also titled "GPS Offset Calibration for UAVs," which application claims priority to the above-identified provisional application and is also hereby incorporated by reference in its entirety.

The UAV may follow a boustrophedonic flight path or flight pattern while the imaging system captures a series of images and/or collects non-visible image scan information. In some embodiments, the UAV may also position itself at various altitudes and angles relative to the roof to collect oblique images at one or more heights and/or relative to each face of the roof. To facilitate rendering of a three-dimensional model, the UAV may perform a loop scan of the roof while the imaging system captures a set of oblique images. For additional detailed images of the roof, the UAV and imaging system may perform a series of micro scans, sometimes referred to as detailed micro scans or microscans. A micro scan may consist of or include a patch scan analysis of a patch or sample region with defined dimensions. Using the collection of images, a rendering system may generate interactive models of the roof and/or optionally the underlying structure. Examples of patch scans, such as test square samples, are described in U.S. patent application Ser. No. 15/444,164 filed on Feb. 27, 2017, titled "Systems and Methods for Surface and Subsurface Damage Assessments, Patch Scans, and Visualization," which application is hereby incorporated by reference in its entirety.

In some embodiments, a loop scan may be omitted and a crisscross boustrophedonic flight pattern may be utilized that captures obliques during approach portions of each pass of the crisscross boustrophedonic flight pattern and/or during rounded structure-facing end passes. As described below, a crisscross boustrophedonic flight pattern may include two boustrophedonic flight patterns that are performed at an angle relative to one another (e.g., at a 90-degree angle). In some embodiments, a crisscross boustrophedonic flight pattern may include more than two boustrophedonic flight patterns, each of which is at an angle to the others (e.g., three crisscross boustrophedonic flight patterns at 120-degree angles relative to one another). Regardless of the number of boustrophedonic flight patterns used (1, 2, 3, . . . etc.), the camera may be transitioned to various angles during one or more passes, as described below, to allow for the generation of a three-dimensional model without the use of a distinct loop scan and/or separate oblique image captures.

A camera (or another sensor) of a UAV may be tilted up to face or partially face the structure as the UAV approaches the structure. The camera may begin to tilt downward as the UAV gets closer to the structure during each pass, such that when the UAV begins to pass over the structure the camera is pointed downward. The camera may remain pointe downward as the UAV passes the structure and begins to turn for the next pass of a given boustrophedonic flight pattern.

As the UAV is again approaching the structure (this time from the other side), the camera may again be pointed toward the structure to capture oblique images. As the UAV again begins to pass over the structure, the camera may point downward for the remainder of that pass. Thus, during each pass of a given boustrophedonic flight pattern, the camera may be pointed toward the structure during each approach and transition (e.g., gradually) to a downward orientation (tilt angle) while it passes over the structure and during the departure from the structure (i.e., before the UAV turns around for the next pass of the boustrophedonic flight pattern).

In some embodiments, one or both of the end passes of one or more of the boustrophedonic flight patterns of a crisscross boustrophedonic flight pattern may comprise structure-facing end passes. A structure-facing end pass may be rounded in some embodiments. Regardless of whether the structure-facing end pass(es) are rounded or not, the UAV may be rotated (e.g., flown sideways) to capture a series of images with the UAV facing the structure as the "end pass" (e.g., first and/or last pass) of given boustrophedonic scan. In some embodiments, the structure-facing end passes, including rounded structure-facing end passes, may be used in combination with the forward-angled camera orientation image capture approach during approaches of the other passes (i.e. non-end passes) of each boustrophedonic scan.

In some embodiments, the slope of the roof may be determined during the boustrophedonic flight pattern(s) and/or patch scans may be conducted during one or more passes of the boustrophedonic flight pattern(s). In some embodiments, the UAV may interrupt the pass of the boustrophedonic flight pattern to determine the slope and/or capture patch scan data. This may allow for an integrated flight pattern where all data is captured during a single flight pattern that appears to be a crisscross boustrophedonic flight pattern with interruptions for one or more of: patch scans, shadow avoidance, slope determinations, detailed microscans, etc.

The UAV may, optionally, capture a nadir image (i.e., top-down) of the entire site. The UAV roof analysis system may use the nadir image to align the UAV with landmarks established in the initial identification of the site, structure, and/or roof. The UAV roof analysis system may also use the nadir image to generate a flight pattern or adjust a predefined flight pattern to ensure accuracy and uniformity. The flight pattern may include any combination of one or more flight patterns, including: (1) a crisscross boustrophedonic scan, (2) a patch scan, and (3) user selected micro scans. In some embodiments, a roof analysis may require only one or two of the three types of scans. Thus, in some embodiments, one or more scan types may be omitted. For instance, in some situations a single crisscross boustrophedonic scan may be used to generate a three-dimensional model of a structure and include integrated patch scans and/or detailed micro scans of the structure. In other embodiments, the crisscross boustrophedonic scan may be used to generate a three-dimensional model, while distinct scans are used for patch scans and/or detailed microscans.

In one implementation, an operator may manually navigate a UAV to a location proximate a face of a roof. Autonomously, or in response to an operator request, the UAV roof analysis system may conduct a patch scan analysis of the roof face. In some embodiments, the UAV system may direct the operator to (1) navigate the UAV up, down, left, right, forward, or backward and/or (2) change the angle of a sensor system (e.g., camera) on the UAV to facilitate a patch scan analysis. In another embodiment, once the UAV has been positioned proximate a face of a roof by an operator, a "perform patch analysis" button may be selected and the UAV roof analysis system may autonomously navigate the UAV to the correct location by making minor positional adjustments and/or adjust sensor systems as needed to perform one or more patch scan analyses on the face of the roof. In still other embodiments, as described herein, the entire processes from takeoff to landing may be automated and patch scan analysis(es) may be conducted for one or more faces of the roof of a structure.

In embodiments utilizing a crisscross boustrophedonic scan, the UAV may follow a flight pattern where the UAV travels from edge to edge of the site or roof edges in alternating offset zones (or slightly beyond each edge of a roof or slightly less than each edge of a roof). The camera or another sensing system on the UAV may capture images of the roof as the UAV travels in the boustrophedon pattern. The UAV roof analysis system may merge the images to form a detailed aerial view of the roof and/or underlying structure and site. The level of detail in the detailed aerial view may be improved by lowering the altitude of the UAV and using minimal offsets. However, the altitude used for a boustrophedonic scan may be limited due to the height of structures and obstacles on the site. In some embodiments, varying altitudes may be utilized to during approaches, departures, during end passes, during various non-end passes, etc.

In some embodiments, the boustrophedonic scan alone may be used to develop a top-down or aerial view of the roof. In other embodiments, the images and scan information obtained during the boustrophedonic scan may be combined with other available data or used to refine other available data. The scan information may, as previously described, include information from optical imaging systems, ultrasonic systems, radar, LIDAR, infrared imaging, moisture sensors, and/or other sensor systems.

During a third scan stage, the UAV may perform a micro scan for close-up and/or otherwise detailed data capture of the roof using one or more sensors and/or sensor types. For examples, tens, hundreds, thousands, or even millions of pixels of sensor data may be used to capture each square inch of a roof or other surface or subsurface. The level of detail far exceeds that available via other types of aerial imaging for a given sensor system. The micro scan may include patch scans of one or more faces of the roof. The micro scan of the roof may provide detailed images (visible spectrum or otherwise) for analyzing the roof. The granularity from the micro scan may assist in detailed measurements, damage identification, and material identification. For example, the micro scan may allow an insurance adjuster to zoom in on a three-dimensional model of the structure to view and assess a patch of roof with a predetermined size and/or shape. In some embodiments, detailed images (or other scan data) captured during the crisscross boustrophedonic scan may constitute detailed micro scans and/or provide data for patch scans.

A patch scan may comprise an analysis of a region or sample section of a roof having a predetermined square footage, size, shape, and/or relative location. The patch scan analysis may identify damage, assess the severity of the damage, identify colors, materials, etc. An assessment of the severity of the damage is not subjective. Rather, the severity of the damage may be categorized based on material type and be objectively associated with a loss of life expectancy, reduced structural integrity, water permeability, loss in insulation qualities, loss of reflective qualities, and/or an objective loss of aesthetic appeal (e.g., a percentage of pixels mismatched as compared to an undamaged portion of the roof). Thus, in a basic embodiment the size of a damage point alone may be used to assign a severity value to the damage point.

In one embodiment, to perform the patch scans, the UAV may perform a series of vertical descents toward the rooftop or alternatively horizontal approaches to the rooftop. A patch scan may be performed separately from the crisscross boustrophedonic scan, or during the crisscross boustrophedonic scan. For instance, the UAV may begin in a starting position at the base altitude (or horizontal distance) and lower its altitude (or decrease its horizontal distance) until it is at a target distance from the rooftop. In one embodiment, the camera or another sensor system on the UAV may capture an image when the target distance is reached. In another embodiment, the camera may take a set of images as the UAV approaches the rooftop. After the image at the target distance is captured, the UAV may return to the further distance and travel a target lateral distance and once again approach that roof to a target distance. In some embodiments, the images may slightly overlap to ensure coverage of the entire structure. In other embodiments, a single patch scan (or another predefined number of patch scans) from each face of the roof may be sufficient. The UAV may continue to perform approaches separated by a defined lateral distance until the entire rooftop has been assessed or until the desired number of patch scans per face of the roof has been completed.

While compatibility with industry standard patch sizes may be useful in some embodiments, in other embodiments it may be preferred to conduct a detailed analysis of the entire structure or entire roof. Moreover, computer vision techniques, computer learning algorithms, and/or artificial intelligence techniques may be employed in combination with one or more of the embodiments described herein. For example, in some embodiments, computer vision (CV) techniques may be employed to detect damage of both interior and exterior surfaces and sub-surfaces of a structure. Examples of these techniques include, but are not limited to, pattern recognition, edge detection, measurements, ratio analysis, etc.

Thus, a traditional patch analysis requires a human adjuster to inspect a roof and draw sample region using, for example, chalk. For example, the adjuster may draw a sample region that is 10'×10' or 15'×6.666' for a 100 square-foot sample region. The dimensions of the square or rectangular sample region may be increased or decreased for a target square footage and or specific length or width. A sample region is generally used to reduce the workload of the adjuster or another evaluator. The concept is that the sample region is large enough to be representative of the remainder of the roof, and so there is no need to do a complete analysis of the entire roof.

However, this can lead to inaccurate conclusions, incorrect repairs, and/or time and money being spent for naught. Using the systems and methods described herein, real-time adaptive analysis of an entire roof or entire face of a roof may be performed. For instance, the systems and methods described herein may be used to automatically detect damage, such as hail, over the entire surface of the roof thereby eliminating the need for a manual inspection process. Nevertheless, to conform to industry standards and/or to attain a sufficiently accurate analysis for a give application, patch scans such as test squares and/or test rectangles with sample regions having defined dimensions and/or square footage targets may be utilized as described herein.

In various embodiments, each patch scan may be performed with image sensors orthogonal to the rooftop at a center of the patch scan. For instance, a 10'×10' patch scan may comprise positioning the UAV a predefined distance from the surface of the roof at a center point of the 10'×10' patch with the sensor(s) orthogonal to the patch of the roof. As noted herein, the "test square" may be rectangular and may include a defined number of square feet. For example, a 100 square-foot sample size may be used that is captured by a rectangle that is 15' by 6.666'.

In another embodiment, to perform the micro scan, the UAV may traverse the rooftop at a target lateral distance, and sensors may capture images and other sensor data as the UAV travels in a boustrophedonic. To avoid a collision, the UAV may use integrated sensors and/or data captured during a prior loop scan or boustrophedonic scan.

In various embodiments, UAV hardware, firmware, and/or software may be modified, upgraded, and/or programmed to perform the functions, methods, and behaviors described herein. In some embodiments, software, hardware, and/or firmware may be created to interface with pre-existing UAV interfaces. Such hardware and software may be integrated into the UAV, into a portable computing device used by the agent (or homeowner), or be cloud-based and accessible to one or both of the UAV and the portable computing device.

In some embodiments, modifications to one or more portions of a UAV may be made to accomplish the described systems and methods. Hardware, firmware, and/or software may also be used in conjunction with a UAV to extend or replace its capabilities to implement any of the embodiments described herein. In some embodiments, multiple UAVs may be utilized that together provide the desired feature set for a particular application. For example, one UAV may be used for infrared scanning and a different UAV may be used for visible image captures. In some embodiments, the same UAV may be used, but the operator may swap sensor systems during various portions of the scan (e.g., halfway through a scan, an operator may remove a visible spectrum camera and replace it with an infrared camera).

While many of the examples described herein relate to damage assessments and roof replacement repair estimates, similar technology and approaches could be used with minor adaptations for use by rooftop installers, such as satellite dish installers, solar panel installers, swamp cooler installers, antenna installers, and the like.

In some embodiments of the present disclosure, a technician may manually operate a UAV to navigate it around the structure while the UAV autonomously captures the needed data for a desired assessment. In many embodiments, the use of a UAV facilitates and/or augments the services provided by a human, it does not necessarily replace the human role. For example, usage of the systems and methods described herein allow an insurance company or roofing company to send an agent skilled in customer relations and/or sales, regardless of whether that person has training in roof damage analysis or roofing estimates. In other embodiments, a human operator may not be required because the UAV may autonomously perform the one or more of the operations described herein.

A UAV roof analysis system, according to various embodiments described herein, provides a comprehensive, automatic (or at least semi-automatic), and methodical approach for assessing damage on a roof and/or for providing an estimate for remediation of the roof. The types of assessments, reports, and images collected may vary based on a specific application. Generally, the approaches obviate the need for an industry-specific trained technician to be present or at least greatly reduce the workload of such a technician. In some embodiments, the systems and methods described herein may change the qualifications that defined a "technician" qualified to perform analysis of a structure.

The UAV roof analysis system may include a site selection interface to receive an electronic input identifying a location of a roof or roofs. The UAV roof analysis system may also include a hazard selection interface to receive electronic input identifying geographic hazards such as aboveground power lines, tall trees, neighboring structures, etc. In various embodiments, the UAV assessment and reporting system may be preloaded geographic hazard models. The UAV roof analysis system may allow for these hazards to be eliminated from the flight plan to produce a safe path for automated imagery and data capture. The selection of the roof(s) and/or hazards may be performed through an interface on the agent's computing device using satellite images, in real-time based on images transmitted by the UAV, and/or on a previously captured nadir image of a site. Onboard sensors for obstacle avoidance may additionally or alternatively be used for the detection of hazardous obstacles, especially in situations in which incomplete geographic information is available and periodic changes are expected.

As previously noted, the UAV may include a visible spectrum camera to capture images of the structure, sonar sensors, LIDAR sensors, infrared sensors, optical sensors, radar sensors, and the like. The UAV may include one or more onboard processors and/or communication interfaces to communicate with a controller, the computing device, and/or a cloud-based software program. The UAV and/or the agent's computing device may include a non-transitory computer-readable medium for receiving and storing instructions that, when executed by the processor, cause the UAV to conduct a roof analysis, as described herein. The roof analysis may include a crisscross boustrophedonic scan of the roof. Each boustrophedonic scan of the crisscross boustrophedonic scan may include capturing images during a boustrophedonic flight pattern within a first altitude range or first range of altitudes.

In various embodiments, a roof selection interface on the agent's computing device may receive, from the operator/agent, an electronic input identifying a roof. The operator may mark, via an electronic input on a roof identification interface, one or more boundaries associated with the roof, structure, and/or site. The operator may also identify, on the operator client, obstacles, boundaries, structures, and particular points of interest.

For example, an operator who is attempting to scan a residential lot may be presented with a satellite image on a tablet. The operator may select each corner of the lot to identify the boundaries of the lot. The operator may additionally or alternatively drag a finger or stylus along the outline of roof, or faces of each roof section, to mark the perimeter of the roof or roof faces. Further, if the lot has trees or other obstacles, the operator may, for example, press and hold to identify their location and enter an estimated height. The operator may also emphasize certain portions or faces of the roof for analysis, for enhanced analysis, or to be excluded from analysis. For instance, if the operator is collecting data for an insurance claim on a house that is known to have experienced potentially damaging hail from a northwest direction, the operator may highlight the north-facing and west-facing surfaces of the roof for analysis.

A UAV may begin an analysis of a roof with a defined scanning plan to evenly scan a roof or section of a roof. During a defined or dynamic flight pattern, a UAV may detect damage through the use of artificial intelligence (AI), computer vision analysis techniques, and/or through library-matching techniques as described herein. The detected damage may be analyzed according to a ruleset and result in the UAV altering the types of scanning being performed, the level of detail being collected, and/or modify or alter a flight path in real time. Accordingly, real-time modifications to a scanning or navigation pattern may allow for more accurate and/or enhanced (e.g., more detailed) scan data to be collected on an as-needed basis.

In some embodiments, the UAV roof analysis system may automatically identify obstacles, boundaries, structures, and particular points of interest using satellite images, county records, topographical maps, and/or customer statements. For example, the UAV roof analysis system may receive an address of a commercial property to be assessed for damage caused by a tornado. The UAV roof analysis system may use available county records to determine the boundary of the property and location of the roof-bearing structure(s) thereon, and topographical maps of the area to identify objects and structures.

In some embodiments, a UAV may utilize artificial intelligence, computer vision techniques, and/or computer learning algorithms to optimize a flight plan and navigate safes during each flight based on real-time scanning and sensor data. Each subsequent flight or scanning session may be used to update a knowledge base of hazards and other features of a property or flight pattern.

In one embodiment, the UAV may include proximity sensors. The proximity sensors may be used to avoid obstacles on and surrounding the roof and thereby identify safe flight areas above and proximate the roof and surrounding objects. The proximity sensors may also be used to determine how close the UAV is to the structure. For example, a UAV may be programmed to capture images at a distance of five feet from the structure. The proximity sensors may send a signal indicating to the UAV that it has reached the target distance, five feet, and the camera may capture sensor data in response to the signal. The target distance may be adjusted based on desired detail, weather conditions, surface obstacles, camera resolution, camera field of view, and/or sensor attributes. In some embodiments, infrared and other non-optical sensors may be used to provide additional assessment data. For example, materials may be identified based on a spectral analysis and/or damage may be identified based on infrared leaks in a structure.

In other embodiments, the UAV may use additional and/or alternative methods to detect proximity to obstacles and the structure. For example, the UAV may use topographical data. As another example, the UAV may have a sonar system that it uses to detect proximity.

Additionally, in some embodiments, the UAV roof analysis system may perform multiple micro scans with different levels of resolution and/or perspective. For example, a first micro scan with patch analysis may provide detailed images at 10 or 20 feet above a roof. Then a second micro scan with patch analysis may image a portion of the roof at five feet for additional detail of that section. This may allow a faster capture of the roof overall while providing a more detailed image set of a portion of interest. In one embodiment, the UAV roof analysis system may use the first micro scan to determine the portion to be imaged in the second micro scan.

In some embodiments, the UAV roof analysis system may use each portion of a scan to improve the next portion of a scan. For example, the first portion of a scan may identify the location of objects. Sonar or optical sensors may be used in the first portion of a scan to identify the height of the objects and/or physical damage.

During crisscross boustrophedonic flight patterns and/or as part of patch scan analyses, the UAV roof analysis system may automatically calculate a pitch of a roof. In a first embodiment, the UAV roof analysis system may use the UAV's sonar or object detection sensors to calculate the pitch of the roof. For example, the UAV may begin at an edge of the roof and then travel toward the peak. The pitch may then be calculated based on the perceived Doppler effect as the roof becomes increasingly closer to the UAV as it travels at a constant vertical height. In a second embodiment, the UAV may land on the roof and use a positioning sensor, such as a gyroscope, to determine the UAV's orientation. The UAV roof analysis system may use the orientation of the UAV to determine the slope.

In some embodiments, a UAV may hover above the roof but below a peak of the roof. Sensors may determine a vertical distance to the roof below and a horizontal distance to the roof, such that the roof represents the hypotenuse of a right triangle with the UAV positioned at the 90-degree corner of the right triangle. A pitch of the roof may be determined based on the rise (vertical distance down to the roof) divided by the run (horizontal forward distance to the roof).

In some embodiments, a UAV may hover above the roof at a first location and measure a vertical distance from the UAV to the roof (e.g., downward). In one such embodiment, a downward sensor may be used. The UAV may then move horizontally to a second location above the roof and measure the vertical distance from the UAV to the roof. Again, the roof becomes the hypotenuse of a right triangle, with one side of the triangle corresponding to the horizontal difference between the first location and the second location, and the second side of the triangle corresponding to the vertical difference between the distance from the UAV to the roof in the first location and the distance from the UAV to the roof in the second location.

In some embodiments, a UAV may hover above the roof at a first location and measure a horizontal distance from the UAV to the roof. In such embodiments, a forward-, lateral-, and/or reverse-facing sensor(s) may be used. The UAV may then move vertically to a second location above the roof and measure the horizontal distance from the UAV to the roof. Again, the roof becomes the hypotenuse of a right triangle, with one side of the triangle corresponding to the vertical difference between the first location and the second location, and the second side of the triangle corresponding to the horizontal difference between the distance from the UAV to the roof in the first location and the distance from the UAV to the roof in the second location.

In some embodiments, the UAV roof analysis system may use three or more images and metadata associated with those images to calculate the pitch of the roof. For example, the UAV may capture a first image near the roof. The UAV may then increase its altitude and capture a second image above the first image. The UAV may then fly laterally towards the peak of the roof until the proximity of the UAV to the roof is the same as the proximity of the first image. The UAV may then capture a third image. Each image may have metadata associated with it including GPS coordinates, altitude, and proximity to the house. The UAV roof analysis system may calculate the distance of the roof traveled based on the GPS coordinates and altitude associated with the three images using the Pythagorean theorem. The UAV roof analysis system may then calculate the pitch by taking the ratio of the altitude and the distance of the roof traveled.

In some embodiments, to maintain stationary a UAV may have to tilt the body and/or one or more propellers to compensate for wind or other environmental factors. For various measurements and scans described herein, the images, measurements, and/or other captured data may be annotated to identify the tilt or angle caused by the UAV tilt. In other embodiments, the sensors, cameras, and other data capture tools may be mechanically or digitally adjusted, such as gyroscopically, for example. In some embodiments, measurements, such as distances when calculating skew and/or roof pitch, may be adjusted during calculations based on identified UAV tilt due to environmental factors. Similar measurements from various points relative to the roof may be used to identify sagging or bulging portions of the roof that fit within a patch size or are larger than a patch size.

The UAV may use the calculated pitch to adjust the angle of the camera to reduce image skew during a micro scan and/or loop scan. For example, once the pitch is calculated the UAV may perform a micro scan with the camera at a perpendicular angle to the roof and/or de-skew the image using software on the UAV, during post-imaging processing, and/or through cloud-based processing. In various embodiments, the calculated pitch is used to angle the camera so it is perpendicular (orthogonal) to the roof to eliminate skew during patch scan analyses.

In some embodiments, a pitch determination system may determine a pitch of the roof based on at least two distance measurements, as described above, that allow for a calculation of the pitch. An imaging system of the UAV may capture an image of the roof of the structure with the optical axis of the camera aligned perpendicular to a plane of the roof of the structure by adjusting a location of the UAV relative to a planar surface of the roof and/or a tilt angle of the camera of the UAV.

The UAV roof analysis system may also reduce and/or identify shadows in the images by calculating the current angle of the sun. The UAV roof analysis system may calculate the angle of the sun based on the time of the day, the day of the year, and GPS location. To eliminate the UAV's shadow from appearing in captured images, the UAV roof analysis system may apply the angle of the sun to the current UAV position in flight. The UAV position, the angle/position of the sun, and the relative location of surfaces and structures (e.g., roof) may determine precisely where the shadow of the UAV will appear. The UAV may adjust its position and camera based on the location of the roof shadow to ensure that each photograph will be captured in such a way as to substantially or completely eliminate the UAV's shadow.

In some embodiments, the UAV roof analysis system may also use the angle of the sun to determine the best time of day to photograph a site or portion of a site. For example, the shadow of an object on a site may obscure a structure during the morning. Based on the angle of the sun, the UAV roof analysis system may determine what time of day the shadow would no longer obscure the structure. The UAV may autonomously collect images during different times of day to ensure that shadow-free images of all, most, or specific portions of the structure are captured during boustrophedonic, loop, and/or micro scans. The systems and methods described herein are repeatable on a consistent basis for various properties and structures and are therefore aptly characterized as systematic.

In other embodiments, a shadow determination system (local or remote) may calculate (as opposed to directly observe) a location of a shadow cast by the proximate object onto the structure based on a current location of the sun, which can be accurately determined based on a current time and a GPS location of the structure. The imaging system may account for the shadow by (1) annotating images of the structure that include the calculated shadow, (2) adjusting an exposure of images of the structure that include the calculated shadow, and/or (3) identifying a subsequent time to return to the structure to capture non-shadowed images of the portions of the structure that are currently shadowed.

The UAV, server, and operator client may be connected via one or more networks. For example, the UAV may transmit images to the server via a cellular network. Additionally, the UAV may connect to the client via a second network such as a local wireless network. The UAV, server, and operator client may each be directly connected to each other, or one of the elements may act as a gateway and pass information received from a first element to a second element.

A standard flight plan may be saved on the server. The standard flight plan may be loaded on the UAV and altered based on information entered by the operator into the operator client interface. The UAV (e.g., via onboard or cloud-based processors) may also alter the standard flight plan based on the images captured and/or other sensor data.

A UAV system may include onboard processing, onboard storage, communications systems, access to cloud-based processing, and/or access to cloud-based storage. The system may utilize one or more of these resources to analyze, image, and/or otherwise scan the roof. In some embodiments, the system may utilize computer vision in combination with a library of images for identifying properties, characteristics of properties, problems, defects, damage, unexpected issues, and the like.

The inclusion of computer vision intelligence may be adapted based on the use of computer vision in other fields and in its general form for use in UAV roof analysis. Computer visional analysis may include various systems and methods for acquiring, processing, analyzing, storing, and understanding captured images. The system may include digital and analog components, many of which may be interchangeable between analog and digital components. Computer vision tasks may be performed in the cloud or through onboard processing and storage. The computer vision system of the UAV may execute the extraction of high-dimensional data from captured images (optical, infrared, and/or ultraviolet) and other sensor data to produce numerical or symbolic information.

The computer vision systems may extract high-dimensional data to make decisions based on rule sets. High-dimensional data is more than mere three-dimensional image capture (i.e., more than simple stereoscopic imaging). Rather, high-dimensional (or multi-dimensional data) comprises data for which the number of measured/recorded parameters associated with other measured/recorded parameters is many. Using image recognition techniques, for example, a set of n images may each have a resolution of m pixels by k pixels. We can view each pixel within the image as a variable so that each of the n images resides in an m×k dimensional space. From there a training set of images may be used to recognize new defects, structures, material types, etc. Depending on the application and the images, the training/new images may be presented in a lower dimensional sub-space.

Using extracted high-dimensional data (i.e., multi-dimensional data), computer vision techniques may be used for a rule-based analysis of structures that is systematic, uniform, and repeatable. The computer vision systems may utilize images, video sequences, multi-dimensional data, time-stamped data, and/or other types of data captured by any of a wide variety of electromagnetic radiation sensors, ultrasonic sensors, moisture sensors, radioactive decay sensors, and/or the like.

Part of the analysis may include profile matching by comparing captured sensor data with data sets from a library of identifiable sensor profiles. An evaluator module or system may be responsible or partially responsible for this analysis. Such an analysis may be performed locally and/or in the cloud. For example, images of different types of shingles (e.g., asphalt, cedar, and clay) may be used to determine which type of shingle is on a roof being analyzed. Upon a determination that the shingles are asphalt, the system may compare captured images of the asphalt shingles on the roof with a library of defects in asphalt shingles to identify matching defects. The system may also use computer vision analysis techniques, artificial intelligence decision-making techniques, optionally in combination with a library of data to modify alter the flight plan or path in real-time based on materials and/or damage that are detected.

For example, during a scanning process, one or more sensors may collect information that may be used to query a rule set. The rule set may modify a navigation pattern, flight direction, scan type, scan details, or other action to be taken or being taken by the UAV in response to a rule set's interpretation of the collected information.

As another example, a thermal scan of asphalt shingles may reveal a thermal profile data set that can be compared with a library of thermal profiles. A matched profile may be used to determine that the roof is undamaged, damaged, aging, poorly constructed, etc. In some embodiments, a first sensor system may be used and, if a matched profile is found, the system may follow a rule set to take a subsequent action that is different from the action that would have been taken if no matched profile had been found. An evaluator system or module (hardware, firmware, or software) may evaluate various inputs to make a decision and/or determine that human operator input is required.

In one example embodiment, an optical scan may be used to match profiles within the library that indicate that a portion of the roof may have a particular characteristic (e.g., damage, manufacturing material, construction material, construction methods, modification from the prior specification, etc.). A rule set may dictate that, based on the matched profile within the library, another type of sensor system should be used for a subsequent scan and/or indicate that a scan with increased resolution or detail is warranted. In some embodiments, a three-dimensional representation of the roof may be visualized on a computing device. The agent, homeowner, or another user may click on a location on the three-dimensional representation to view micro scans, such as a patch scan.

As above, numerous examples and descriptions are given with respect to roof surfaces and roof subsurfaces. Roofs are merely one example of a surface or subsurface that can be analyzed and/or scanned using the systems and methods described herein. Many, if not all, of the embodiments and combinations of embodiments of the systems and methods described herein may be applied to various exterior and interior surfaces of a structure or other property.

The term "surface or subsurface" as used herein is used in an inclusive sense such that scanning or analyzing "a surface or subsurface" may include scanning or scanning or analyzing the surface, the subsurface, or both the surface and the subsurface. A surface may include any exposed surface of a structure or other property. A subsurface may include anything beneath, behind, hidden, or obscured by the surface to one or more sensor types.

For instance, an optical imaging sensor may be used to scan a surface of a roof. An infrared imaging sensor may be used to scan a surface of a roof as well, but may also be used to image thermal variations in the subsurface of the structure, such as embedded moisture, underlying structural members, and the like.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special-purpose processing device, such as an ASIC, a PAL, a PLA, a PLD, a CPLD, a Field Programmable Gate Array (FPGA), or other customized or programmable device. The computer may also include a computer-readable storage device, such as non-volatile memory, static RAM, dynamic RAM, ROM, CD-ROM, disk, tape, magnetic memory, optical memory, flash memory, or another computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism.

Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

Some of the embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Further, those of skill in the art will recognize that one or more of the specific details may be omitted, or other methods, components, or materials may be used. In some cases, operations are not shown or described in detail. Thus, the following detailed description of the embodiments of the systems and methods of the disclosure is not intended to limit the scope of the disclosure, as claimed, but is merely representative of possible embodiments.

FIG. 1A illustrates an example of a user interface 100 for initiating one of three scan types, including a crisscross scan 110, a test square scan 111, and a detail drop scan 112 via an electronic computing device. The user interface 100 may be implemented on a computing device, such as a tablet, mobile phone laptop, etc. In other embodiments, the user interface 100 may be implemented on a dedicated controller of a UAV. In still other embodiments, the user interface 100 may be implemented on a screen (e.g., a touch screen) directly on a UAV. Various settings for the scan may be available via a settings interface 120. In some embodiments, a full scan 130 may be selected that will automatically implement one or more of the crisscross scan 110, the test square scan 111, and the detail drop scan 112. In some embodiments, the test square scan 111 may be integrated as part of the crisscross scan 110 and not available as a distinct option.

Figure 1B:
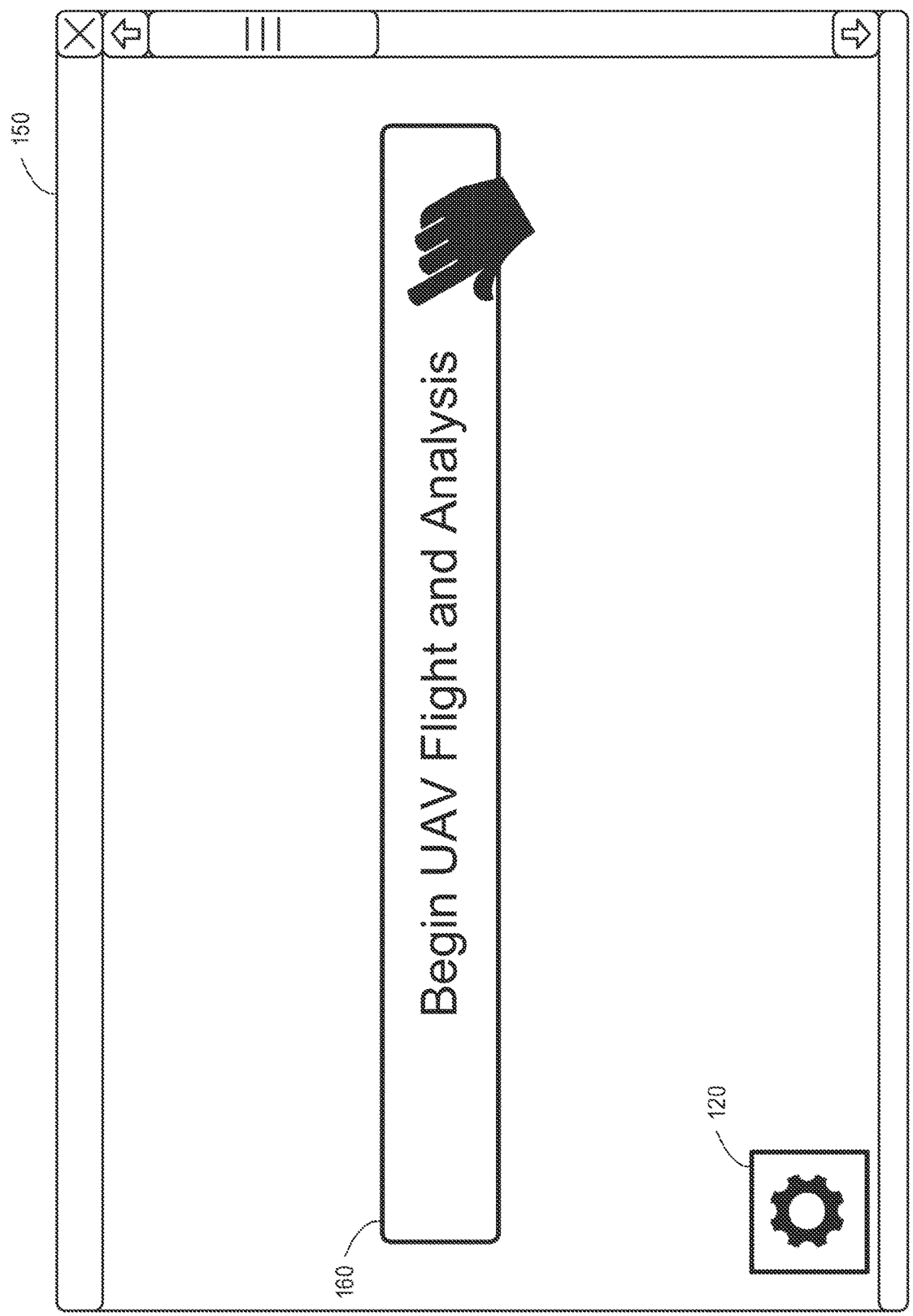
FIG. 1B illustrates an example of a user interface for initiating a default UAV roof analysis via an electronic computing device, where the default scan may be any one or more of the three scan types of FIG. 1A.

FIG. 1B illustrates an example of an alternative user interface 150 for initiating a standard or default UAV roof analysis, via icon 160, from an electronic computing device, according to one embodiment. As illustrated, the user interface 150 may allow an operator (e.g., an owner or agent, representative, contractor, or employee of a company) to push a button (e.g., touch, click, key entry, etc.) to begin analysis. In various embodiments, the system may collect data from the entire roof and/or a predefined sample size from one or more sections of the roof. In various embodiments, the entire roof may be scanned and analyzed. To conform with various industry standards, the entire roof may be scanned using one or more patch scan regions with defined dimensions. Again, settings 120 may allow for the default flight and/or analysis to be defined and/or adjusted for a particular application.

Figure 2A:
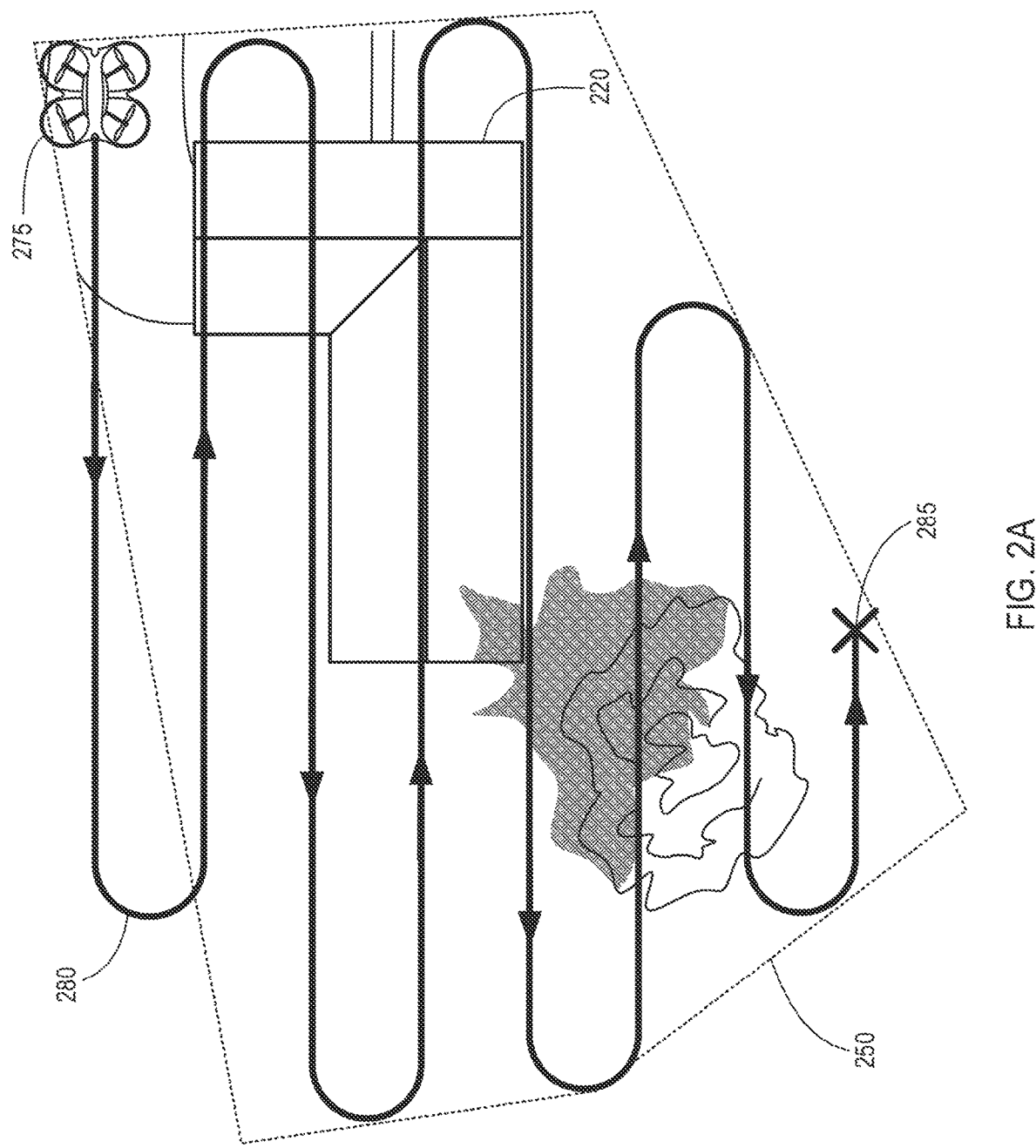
FIG. 2A illustrates boustrophedonic flight path of UAV for assessing a property, according to one embodiment.

FIG. 2A illustrates a boustrophedonic scan of a rooftop defined by the identified geographic boundaries 250 that include a structure 220. During the boustrophedonic scan, the UAV 275 may capture images while following a boustrophedonic flight pattern 280. For clarity, the number of passes shown is eight; however, the actual number of passes may vary based the size of the roof being analyzed, elevation of the UAV, desired detail level, sensor field of view (e.g., camera zoom), desired overlap of captured images, etc. Similarly, the flight path may not extend to the boundaries of the property but instead only extend just beyond or just short of the boundaries of the roof of the structure 220.

Alternatively, the flight path may extend beyond the boundaries of the property. In some embodiments, the boundaries 250 of the property are irrelevant and/or not provided. In such instances, the flight path may be adapted to capture sufficient images or other scan data of the structure 220. Again, the number of passes, length of the passes, and the distance between the passes may depend on a desired resolution, camera field of view, camera resolution, height of the UAV 275 relative to the roof, and/or other characteristics of the desired scan, capabilities of the UAV 275, and attributes of the surface.

The UAV 275 may fly to a start location or be launched from the start location. The start location may be at a first corner of the property 250 or the roof of the structure 220. The UAV 275 may then follow a straight path until a boundary line or edge of the roof is reached. The UAV 275 may then turn and follow an offset path in the opposite direction. While rounded turns are illustrated, in some embodiments the turns may have sharp corners instead since the UAVs can rotate in the air without forward or lateral movement. The UAV 275 may continue to travel back and forth until an endpoint 285 is reached and the entire roof (or a selected portion of the roof) has been traveled. The UAV 275 may travel at a high altitude such that it will not collide with any obstacle or structure and/or avoid obstacles in the path by going around or above them. During the flight, the UAV 275 may capture images. In some embodiments, onboard processing or cloud-based processing may be used to identify structures and obstacles. Alternatively, the system may perform an analysis after scanning is complete and the UAV has returned home.

In some embodiments, a loop scan may be used to take a series of angled images of the roof (commonly referred to as obliques) to aid in the creation of a digital three-dimensional model. Various approaches discussed herein obviate the need for "obliques" and/or the loop scan altogether. Thus, the scanning techniques and flight patterns described herein may improve the speed at which a scan can be completed. The use of fewer images to build a three-dimensional model may decrease the processing time, decrease the amount of data stored, decrease processing and interpolation errors, decrease the time to perform image capture, etc.

The orientation of the boustrophedonic flight pattern 280 is defined generally in the direction of the arrows shown on the parallel sections of each pass of the boustrophedonic flight pattern. In the illustrated embodiment, the transition from one pass to a neighboring (i.e., next or previous) pass is made via a rounded pass-offset portion. The width of each pass-offset defines the spacing between passes. In some embodiments (not illustrated) the ends of the passes may be connected via a squared pass-offset portion. In still other embodiments, the passes may be connected via an angled pass-offset portion (see, e.g., FIG. 4D).

Figure 2B:
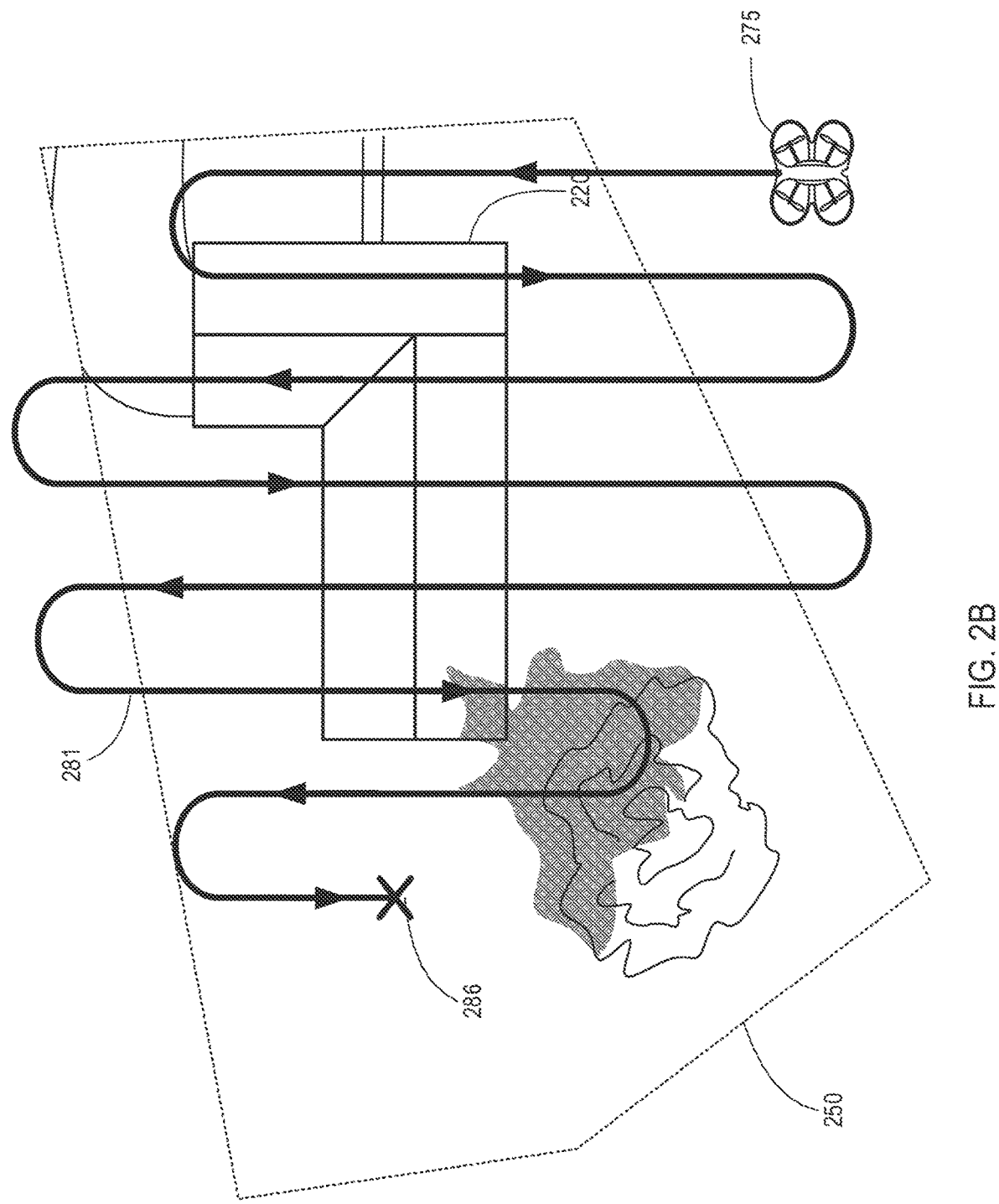
FIG. 2B illustrates second boustrophedonic flight path of UAV that, together with the flight pattern of FIG. 2A, forms a crisscross flight pattern for assessing a property, according to one embodiment.

FIG. 2B illustrates second boustrophedonic flight pattern 281 that is at an angle relative to the first boustrophedonic flight pattern 280 in FIG. 2A. Together with the boustrophedonic flight pattern 280 of FIG. 2A, the second boustrophedonic flight pattern 281 forms a crisscross flight pattern for assessing a property, according to various embodiments. The first and second flight patterns 280 and 281 may be distinct flight patterns with different endpoints 285 and 286 and different starting points of the UAV 275. In other embodiments, a single crisscross boustrophedonic flight pattern that includes two boustrophedonic flight patterns may be implemented.

Figure 2C:
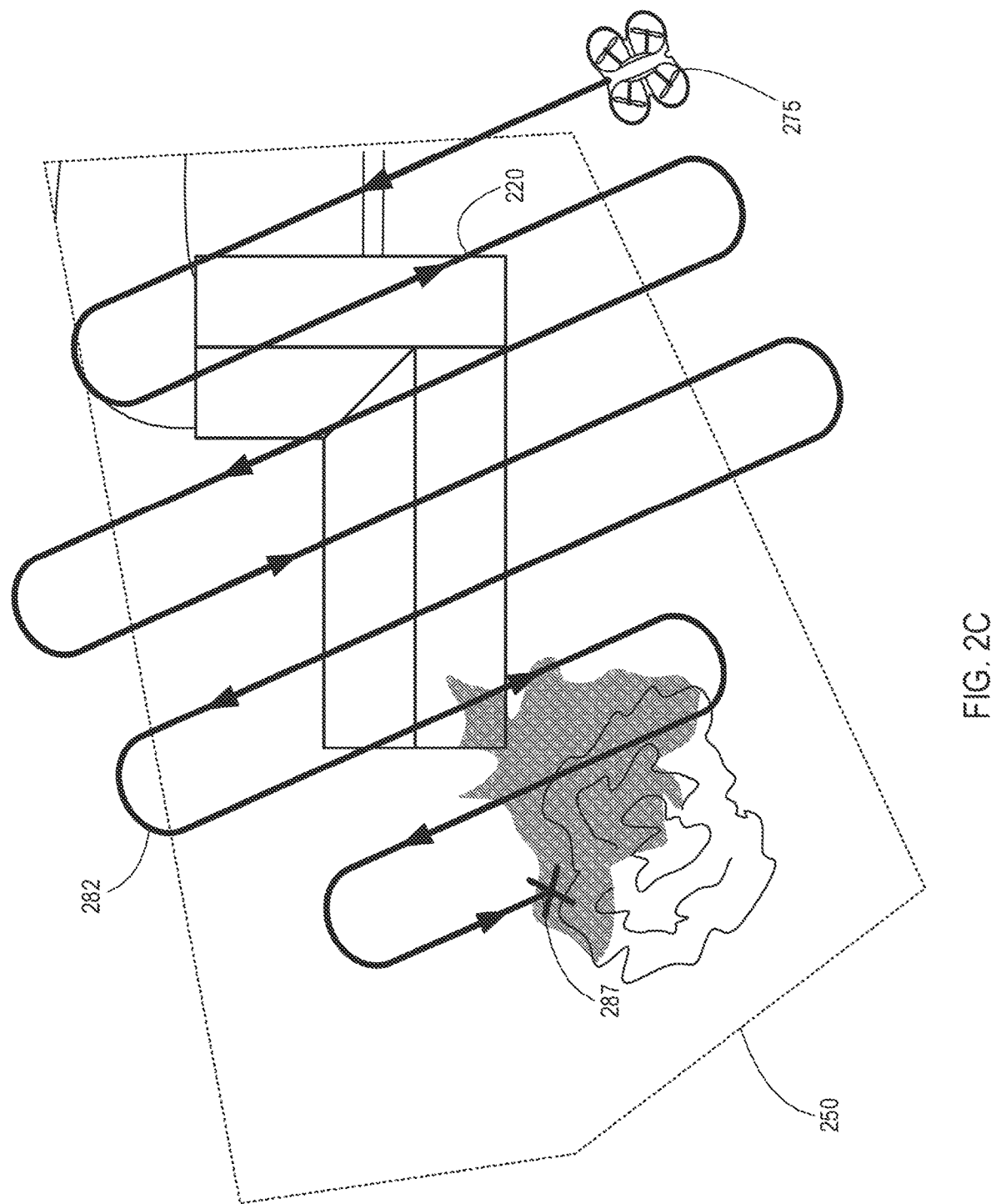
FIG. 2C illustrates an acute angle boustrophedonic flight pattern 282 that is at an angle other than 90-degrees relative to the first boustrophedonic flight pattern 280 in FIG. 2A.

FIG. 2C illustrates an acute angle boustrophedonic flight pattern 282 that is at an angle other than 90-degrees relative to the first boustrophedonic flight pattern 280 in FIG. 2A. Together with the boustrophedonic flight pattern 280 of FIG. 2A and/or the boustrophedonic flight pattern 281 of FIG. 2B, the acute angle boustrophedonic flight pattern 282 forms a crisscross flight pattern for assessing a property, according to various embodiments. The first, second, and/or acute flight patterns 280, 281, 282 may be distinct flight patterns with different endpoints 285, 286, 287 and different starting points of the UAV 275. In other embodiments, a single crisscross boustrophedonic flight pattern that includes two or three boustrophedonic flight patterns (280, 281, and/or 282) may be implemented.

Figure 3:
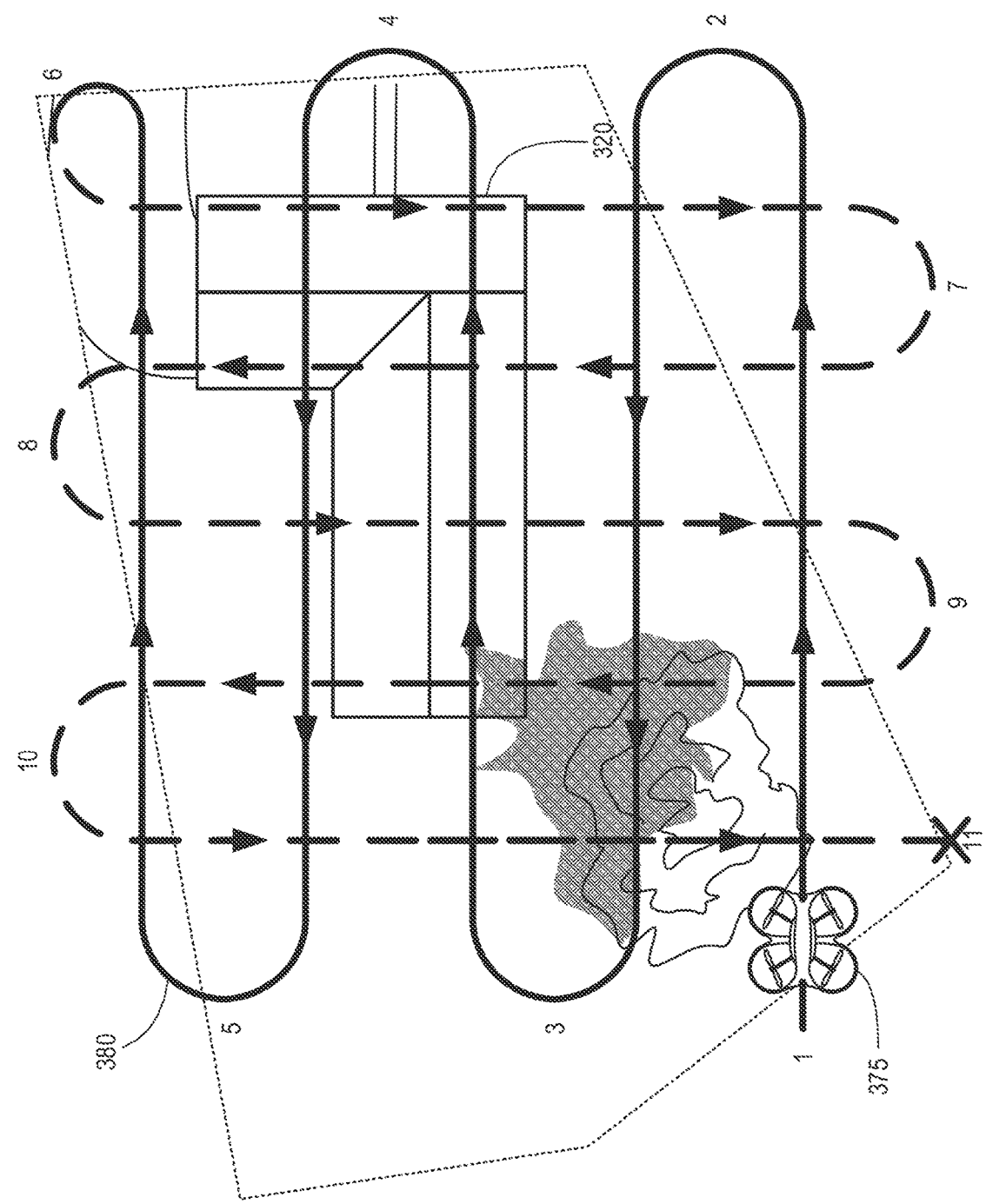
FIG. 3 illustrates a single-flight crisscross flight pattern of a UAV for assessing a property, according to one embodiment.

FIG. 3 illustrates a single-flight crisscross flight pattern 380 of a UAV 375 for scanning a structure 320, according to one embodiment. A first boustrophedonic flight pattern of the single-flight crisscross flight pattern 380 is shown in solid lines and includes locations 1-6. A second boustrophedonic flight pattern of the single-flight crisscross flight pattern 380 is shown in dashed lines and includes locations 6-11. The illustrated embodiment shows the crisscross flight pattern 380 including two distinct boustrophedonic flight patterns (dashed and solid lines) at 90-degree angles relative to one another. Moreover, the illustrated embodiment shows the boustrophedonic flight patterns (dashed and solid lines) at substantially perpendicular angles relative to the exterior walls of the structure 320.

In some embodiments, the crisscross flight pattern 380 may include more than two distinct boustrophedonic flight patterns (e.g., 3 or 4) at 90-degree angles relative to one another. In some embodiments, the single-flight crisscross flight pattern 380 may include two or more distinct boustrophedonic flight patterns at angles that are more than or less than 90 degrees relative to one another. For example, three distinct boustrophedonic flight patterns may be flown that are at 120 degrees relative to one another. In some embodiments, one or more of the two or more boustrophedonic flight patterns may be intentionally flown at angles relative to the exterior walls of the structure 320 to capture improved obliques of the structure. In some embodiments, a nadir image captured by the UAV 375, plat maps, architectural drawings, and/or a satellite image of the structure 320 may be used to orient the UAV 375 and/or the two or more boustrophedonic flight patterns of the crisscross flight pattern 380.

In various embodiments, the crisscross boustrophedonic flight pattern comprises two or more boustrophedonic flight patterns at an angle relative to one another and is sufficient to capture all the necessary scan data (e.g., images, infrared data, etc.) for: (i) capturing a nadir image of a structure; (ii) generating a three-dimensional model of a structure; (iii) capturing "oblique" images of the structure; (iv) generating patch scans with detailed analysis of defects, damage, and/or other anomalies (e.g., via test squares or test rectangles); and/or (v) capturing microscans of one or more portions of the structure or other subject.

Figure 4A:
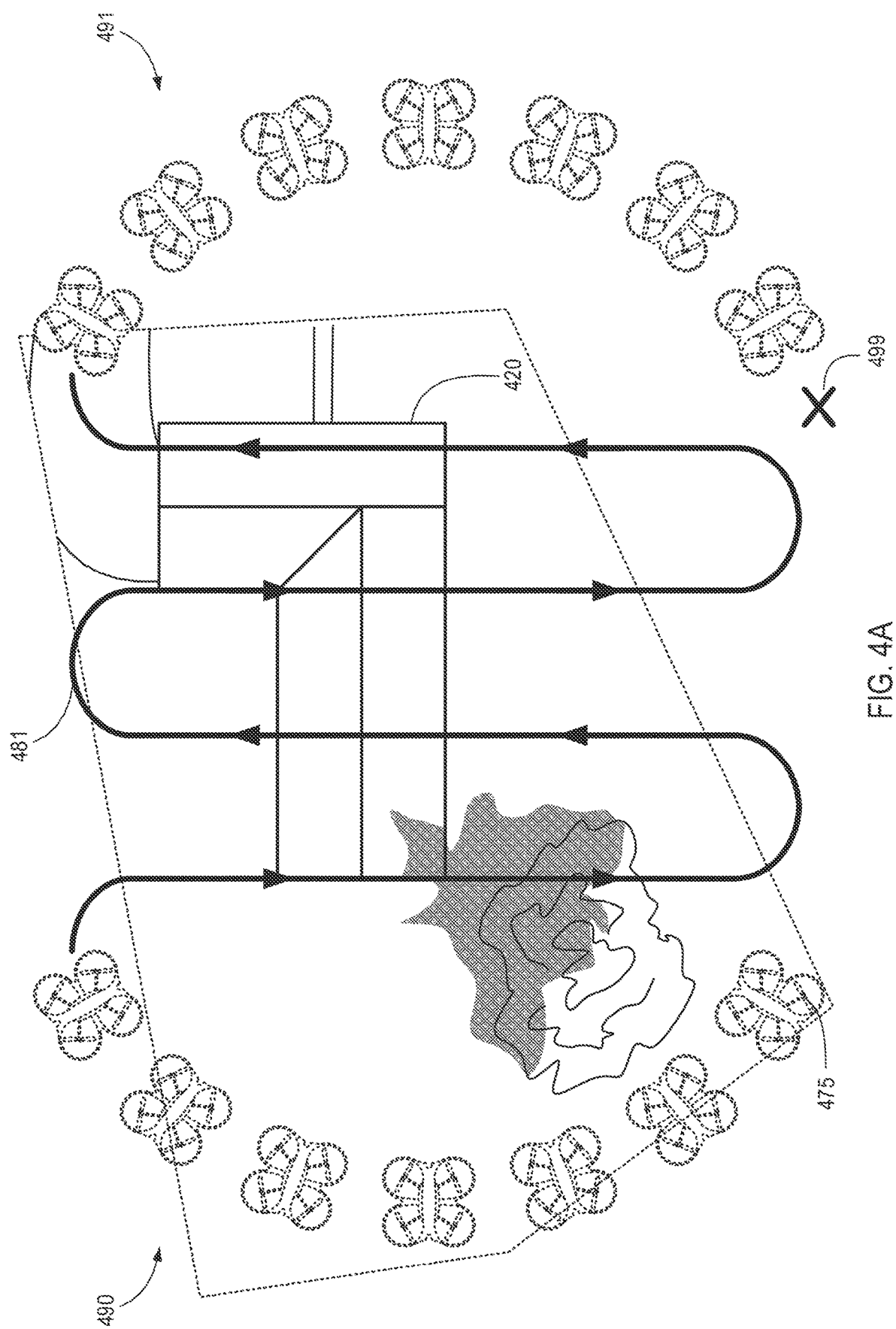
FIG. 4A illustrates a first boustrophedonic flight pattern with rounded structure-facing end passes to capture obliques during boustrophedonic scanning, according to one embodiment.
Figure 4B:
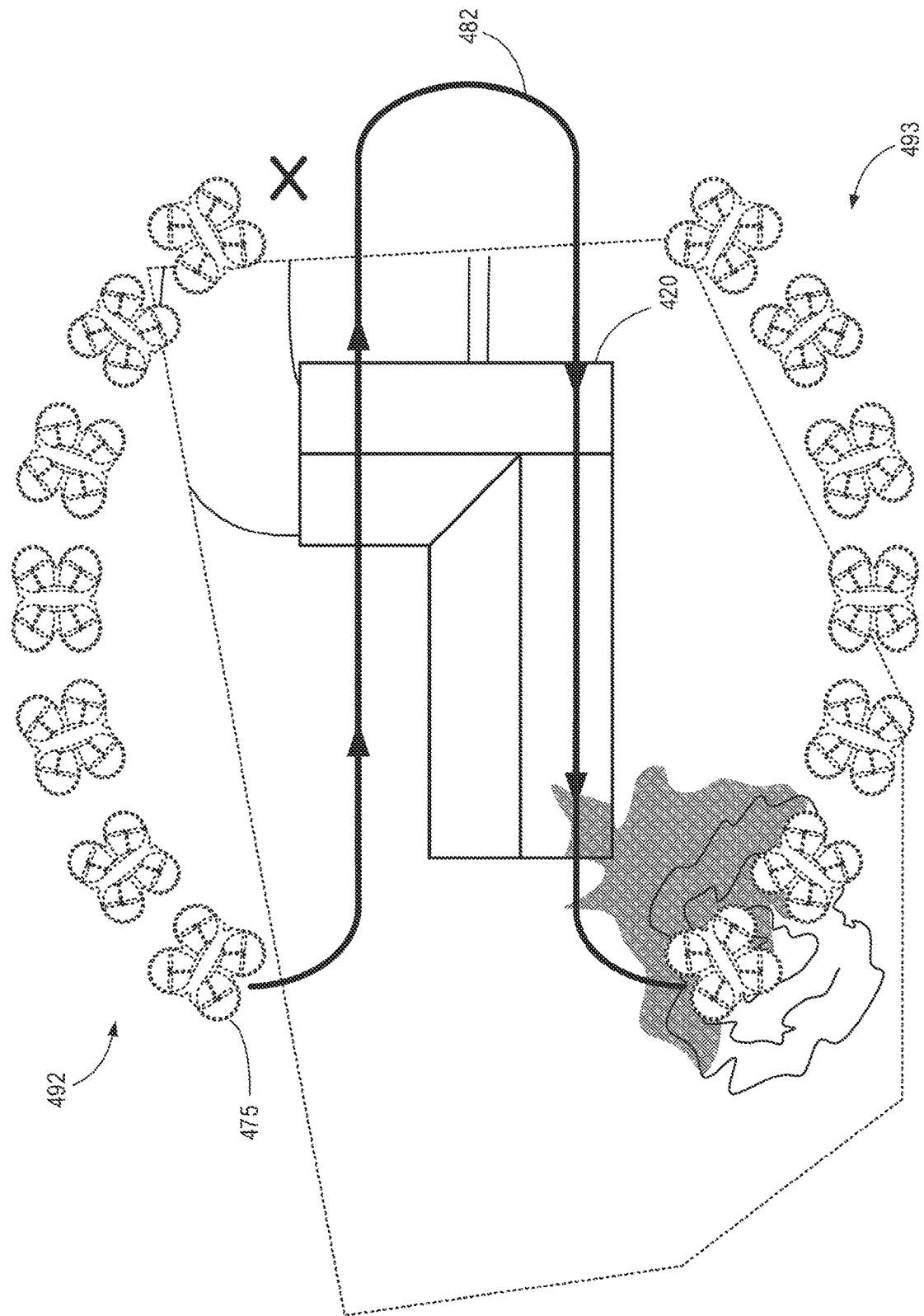
FIG. 4B illustrates a second boustrophedonic flight pattern with rounded structure-facing end passes that, together with the flight pattern of FIG. 4A, forms a crisscross flight pattern for assessing property with integrated oblique image capture, according to one embodiment.
Figure 4C:
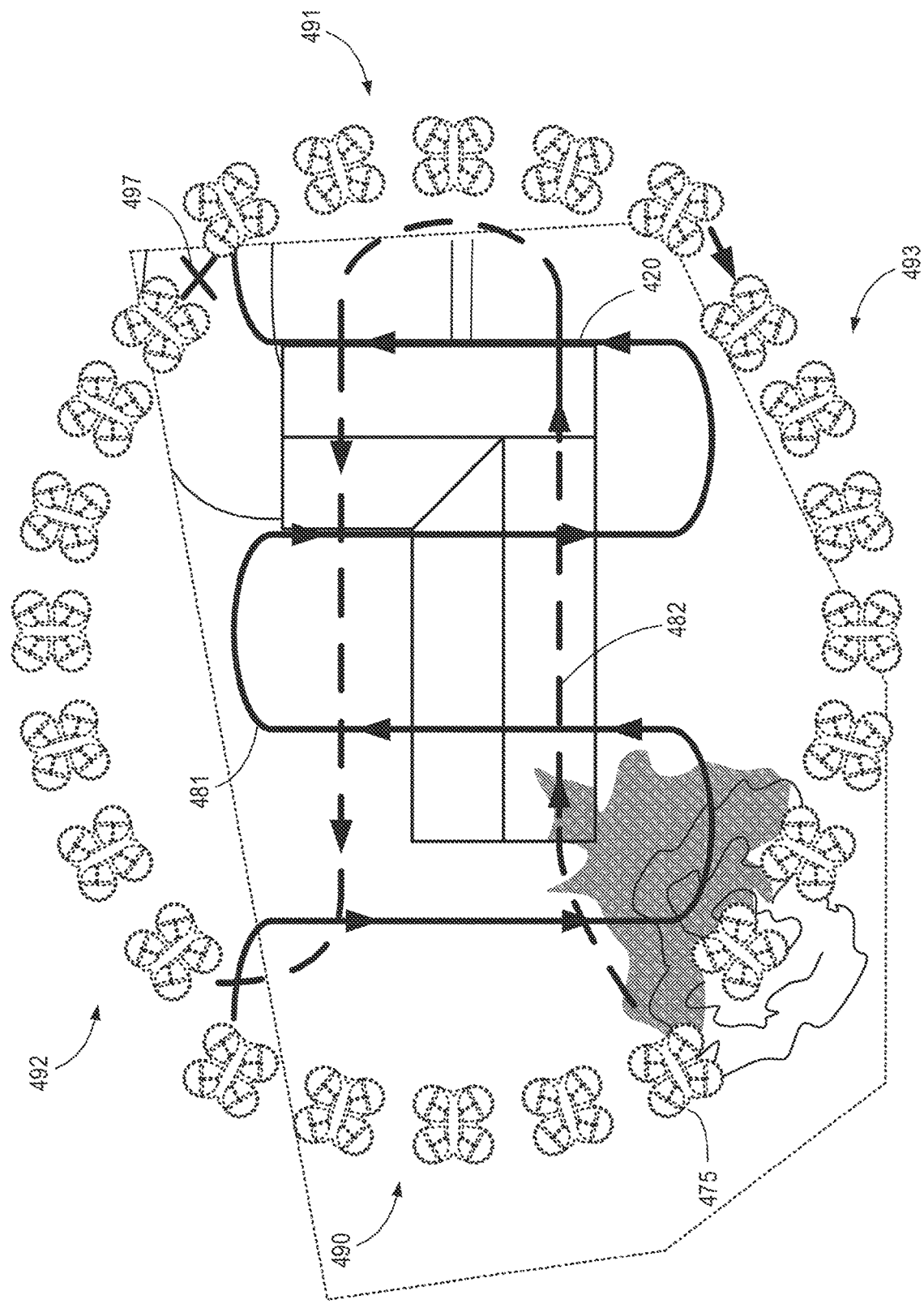
FIG. 4C illustrates a single-flight crisscross flight pattern of a UAV for assessing a property with integrated oblique image capture via rounded structure-facing end passes, according to one embodiment.

FIG. 4A illustrates a first boustrophedonic flight pattern 481 that may optionally be part of a crisscross flight pattern (as shown in FIG. 4C) with rounded structure-facing end passes 490 and 491 to capture obliques during boustrophedonic scanning of a structure 420, according to one embodiment. As illustrated, a UAV 475 may be angled toward a structure during an initial end pass 490. The UAV 475 may be rotated to face the structure 420 while it travels in the arc or curved end pass 490 to capture obliques. In some embodiments, the UAV 475 may travel the arc or curved end pass 490 by moving laterally and backward as it rotates clockwise, and then laterally and forward as it rotates clockwise to maintain the UAV facing the structure 320.

The UAV may then complete the other passes (solid lines) of the boustrophedonic flight pattern 481 before it begins to travel the arc or curved end pass 491. The elevation of the end passes 490 and 491 may be different or the same as the other passes (solid lines) of the boustrophedonic flight pattern 481. The UAV may complete the first boustrophedonic flight pattern 481 at the location 499 and land there or at another designated landing location. Alternatively, the UAV may immediately begin a second (or third, fourth, etc.) boustrophedonic flight pattern at the location 499 or at another designated start location of the second boustrophedonic flight pattern.

FIG. 4B illustrates a second boustrophedonic flight pattern 482 with rounded structure-facing end passes 492 and 493 that, together with the flight pattern 481 of FIG. 4A, forms a crisscross flight pattern for assessing the structure 420 with integrated oblique image capture during the rounded structure-facing end passes 490-493, according to various embodiments.

FIG. 4C illustrates a single-flight crisscross flight pattern of a UAV 475 that includes the first and second boustrophedonic flight patterns 481 and 482 from FIGS. 4A and 4B. As illustrated, the single-flight crisscross flight pattern begins at the marked location of UAV 475 with a rounded structure-facing end pass 490 and then completes passes (solid lines) of the first boustrophedonic flight pattern 481 and rounded structure-facing end pass 491. Rounded structure-facing end pass 491 transitions into rounded structure-facing end pass 493, followed by passes (dashed lines) of the second boustrophedonic flight pattern 482, and concludes with rounded structure-facing end pass 492 to end at location 497. The UAV may land at location 497 or any other designated location proximate or distant from the structure 420.

In some embodiments, the rounded structure-facing end passes 490-493 may be modified to fit a specific curve and/or to be non-rounded (i.e., a straight end pass in which the UAV 475 is structure-facing or, alternatively, not structure-facing). As previously described, a single-flight or multi-flight crisscross flight pattern may include any number of boustrophedonic flight patterns that may or may not include structure-facing end passes and/or rounded structure-facing end passes.

Figure 4D:
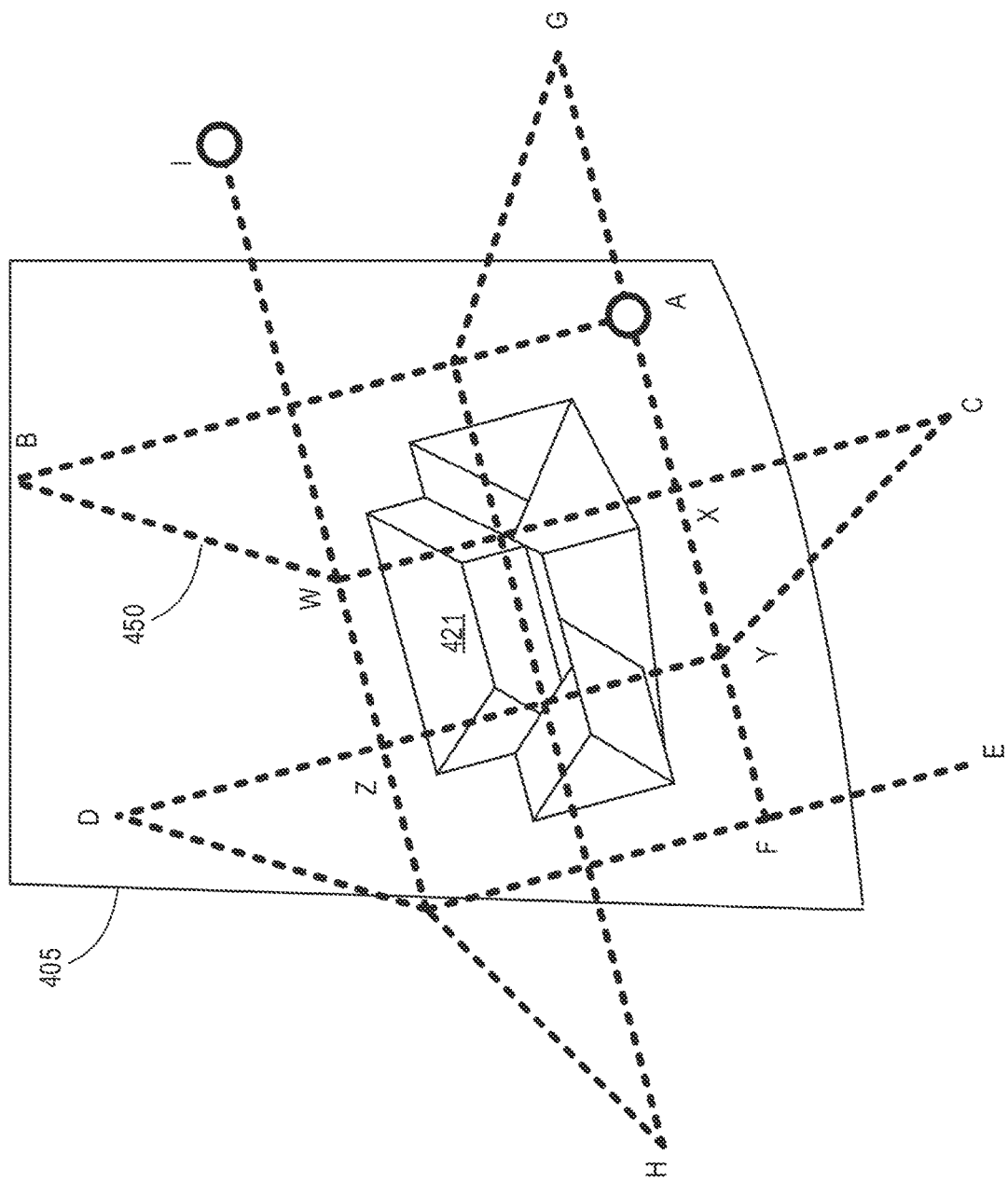
FIG. 4D illustrates an example of a single-flight crisscross boustrophedonic flight pattern of a UAV for capturing scan data via one or more sensors, according to one embodiment.

FIG. 4D illustrates an example of a single-flight crisscross boustrophedonic flight pattern 450 of a UAV for capturing scan data via one or more sensors, according to one embodiment. The illustrated embodiment includes two boustrophedonic flight patterns that are at a 90-degree angle relative to one another to form the crisscross boustrophedonic flight pattern 450. A first boustrophedonic flight pattern may begin at point A and follow points B, C, and D, and end at point E. The UAV may then return to point F and begin a second boustrophedonic flight pattern that includes points F, G, and H, ending at I.

As illustrated, each pass of the boustrophedonic flight pattern may include a segment that is at an angle relative to another segment of the same pass. For instance, the pass between points B and C includes a segment from B to W that is at an angle relative to the segment from W to C. Though not required, the second pass of the first boustrophedonic flight pattern from point C to point D includes a segment from Y to Z that is substantially parallel to the segment between W and X of the first pass between points B and C. In some embodiments, the angled segments (e.g., pass-offset portions B to W and C to Y) may be used to capture structure-facing images in which the UAV is rotated toward the structure during image capture such that the UAV is traveling forward and sideways along the segment.

Each pass may include an approach portion (e.g., approximately, pass-offset portion BW), a flyover portion (e.g., approximately, WX), and a departure portion (e.g., approximately, XC). In other embodiments, as illustrated herein, the pass-offset portions may be rounded and father from the structure, in which case the approach portion may be at the same orientation as the flyover portion and/or the departure portion (see, e.g., FIG. 3).

A nadir image of the structure 421 can be captured during the crisscross boustrophedonic flight pattern 450. A camera or other sensor device on the UAV may be angled upward toward the structure during each approach portion of the crisscross boustrophedonic flight pattern 450 to capture structure-facing images until the UAV begins to pass over, just before the UAV begins to pass over, or just after the UAV begins to pass over the structure 421 (i.e., proximate a location where the UAV begins to pass over the structure 421).

The illustrated embodiment has been implemented and demonstrated to enable the capture of scan data sufficient to: generate a three-dimensional model of the structure, capture nadir images of the structure and/or proximate land 405, capture oblique images of the structure, capture structure-facing images; capture high-resolution scan data sufficient for microscans; determine pitch(es) of one or more portions of the roof of the structure; generate patch scans of sample regions of one or more faces of the roof of the structure; identify construction defects, installation defects, material defects, compromised portions of the structure, moisture damage, and/or other anomalies in the surface or subsurface of the structure; identify materials, and/or determine other characteristics of the structure.

In various embodiments, the crisscross boustrophedonic flight pattern 450 may include more or fewer passes in one or both boustrophedonic flight patterns. The spacing between passes of one or both boustrophedonic flight patterns may be wider or closer together. Moreover, the spacing between passes of one of the boustrophedonic flight patterns may be different than the spacing between passes of the other boustrophedonic flight pattern.

Figure 5A:
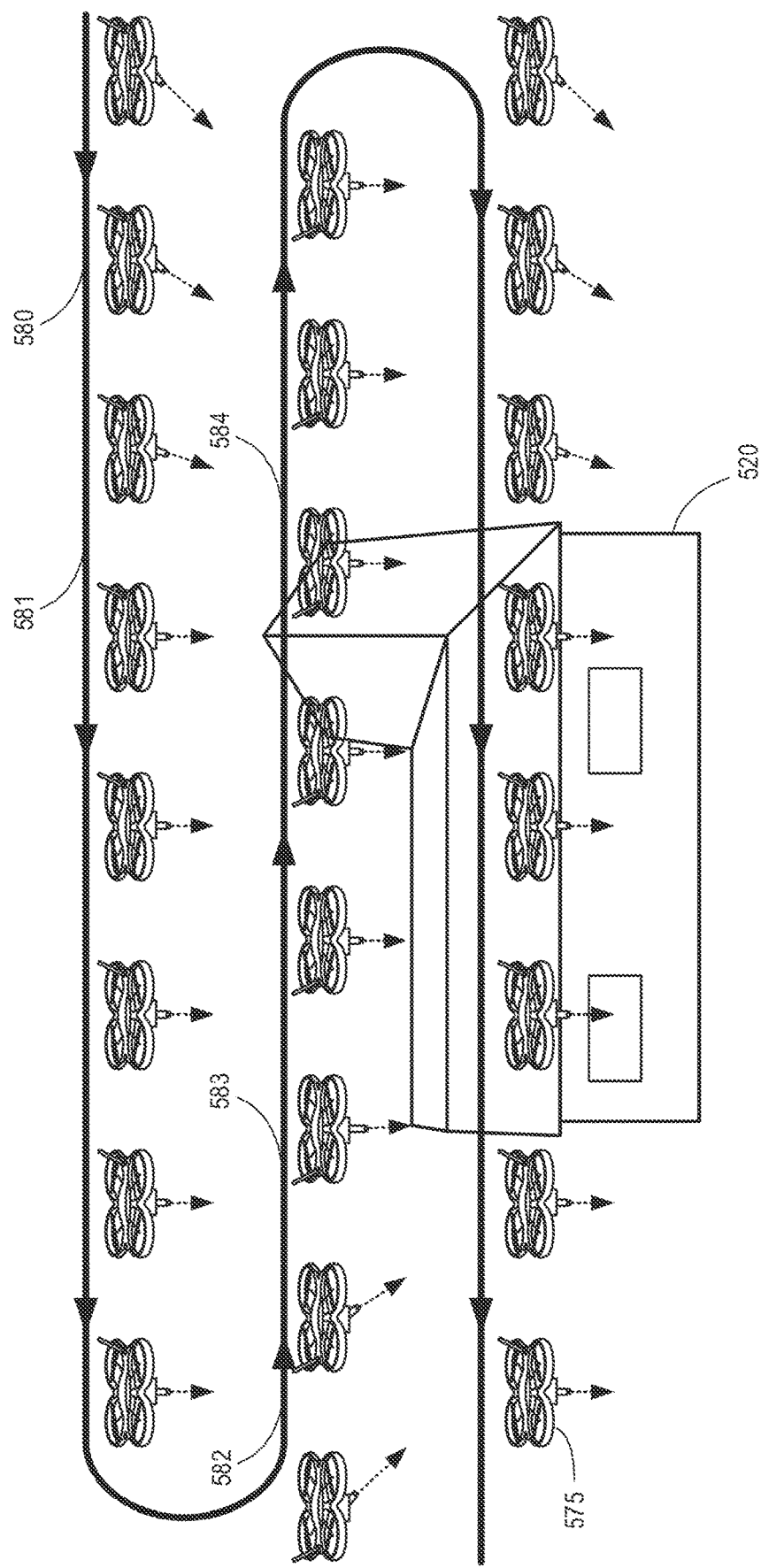
FIG. 5A illustrates a first boustrophedonic flight pattern of a crisscross flight pattern showing example camera angles for integrated oblique image capture during the crisscross flight pattern, according to one embodiment.

FIG. 5A illustrates a first boustrophedonic flight pattern of a crisscross flight pattern showing example camera angles for integrated oblique image capture of a structure 520 during the crisscross flight pattern, according to one embodiment. As illustrated, a camera of the UAV 575 may be angled upward (toward the structure 520) as it approaches the structure 520 and transition to a downward angle as it passes over the structure 520 until it turns around. The transition of the camera from a forward or near-forward facing angle to the downward or near-downward facing angle may be gradual as it approaches, such that it is angle more upward/forward when it is farther from the structure 520. Alternatively, it may transition from a preset forward/upward angle to a preset downward angle at a predefined location relative to the structure 520.

In the illustrated embodiment, the dashed arrows and the cameras illustrated on the undersides of the UAVs 575 are angled during an initial portion 580 of the first pass of the boustrophedonic flight pattern (on approach) and then transition to downward once they reach a second portion 581 of the first pass of the boustrophedonic flight pattern (above the structure and on departure). Similarly, the camera may again be angled toward the structure 520 on the approach portion 582 of the second pass of the boustrophedonic flight pattern and transition to a downward direction on the portion 583 of the second pass that is above the structure 520. The camera may remain angled downward during the departure portion 584 of the second pass after the structure 520. Again, any number of passes may be used for a boustrophedonic scan and multiple boustrophedonic scans may be used to form a crisscross boustrophedonic scans.

In various embodiments, the camera of the UAV may have limited rotational and/or tilt capabilities. For example, the camera (e.g., the mount or gimbal) may allow for tilt between approximately 0 degrees (straight down) and 90 degrees (parallel to forward motion). The camera may not be able to rotate to the left or right at all. In other embodiments, the camera (or, again, an associated mount or gimbal) may have a tilt range of approximately 120 degrees. As described above, the camera may be tilted toward the structure 520 on approach and then generally downward for the remainder of the pass since it cannot be tilted toward the structure (i.e., in the opposite direction of travel).

Figure 5B:
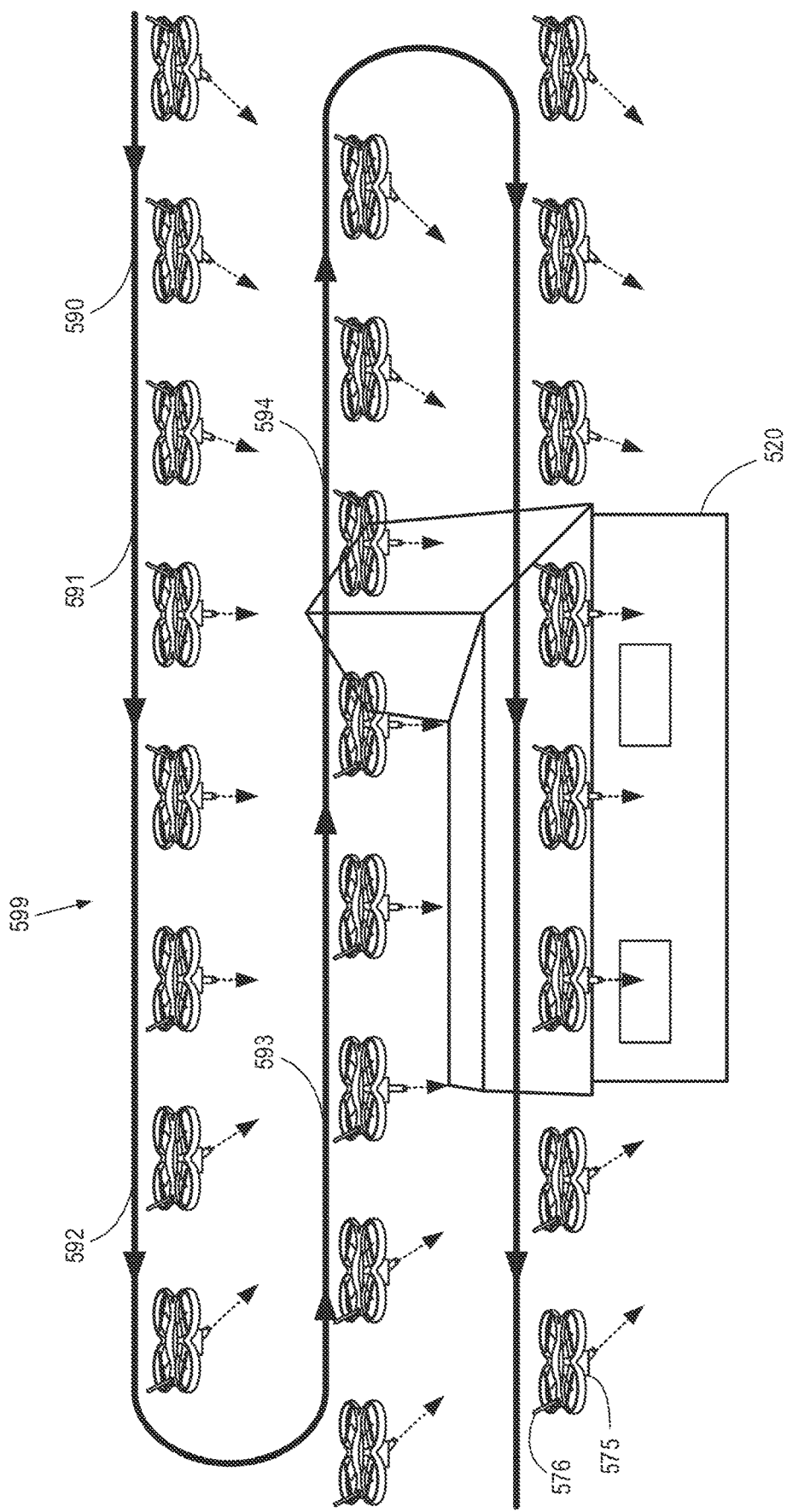
FIG. 5B illustrates a boustrophedonic flight pattern that includes backward flying during a withdraw portion of passes over a structure to capture additional oblique images of the structure, according to one embodiment.

FIG. 5B illustrates an alternative embodiment in which the camera of the UAV 575 is angled upward (toward the structure 520) as it approaches, at 590, the structure 520. During the approach 590, the camera transitions to a downward angle as it approaches a middle portion, at 591, of the structure 520. Rather than the camera remaining tilted to the downward angle for the remainder of the pass (as in FIG. 5A), the UAV 575 rotates 180 degrees, at 599, and travels backward for the remainder of the pass (i.e., during a "withdraw" portion of the pass).

As the UAV 575 travels backward, the camera tilts upward gradually to remain angled toward the structure as the UAV 575 retreats or withdraws backward from the structure 520 for the remainder of the pass, at 592. A protruding antenna 576 has been added to the rear of the UAV 575 to provide a visual indication of the direction of travel during each portion of each pass along the boustrophedonic flight pattern. In practice, such an antenna my not be visible and is simply added to the drawings to provide directional context. It is appreciated that any of a wide variety of UAV designs, shapes, sizes, etc. may utilize, or be modified to utilize, the systems and methods described herein.

The transition of the camera from the downward position to the rearward facing angle as the UAV 575 retreats, at 592, may be gradual so that the camera is angled more upward/rearward when it is farther from the structure 520. Alternatively, it may transition from a preset rearward/upward angle to a preset downward angle at a predefined location relative to the structure 520. The same pattern of camera tilting and backward flying can be performed for each pass of the boustrophedonic flight pattern to capture images of the structure 520 at various angles during a continuous boustrophedonic flight pattern or, as described herein, during a continuous flight that includes two or more boustrophedonic flight patterns at angles relative to one another.

Figure 5C:
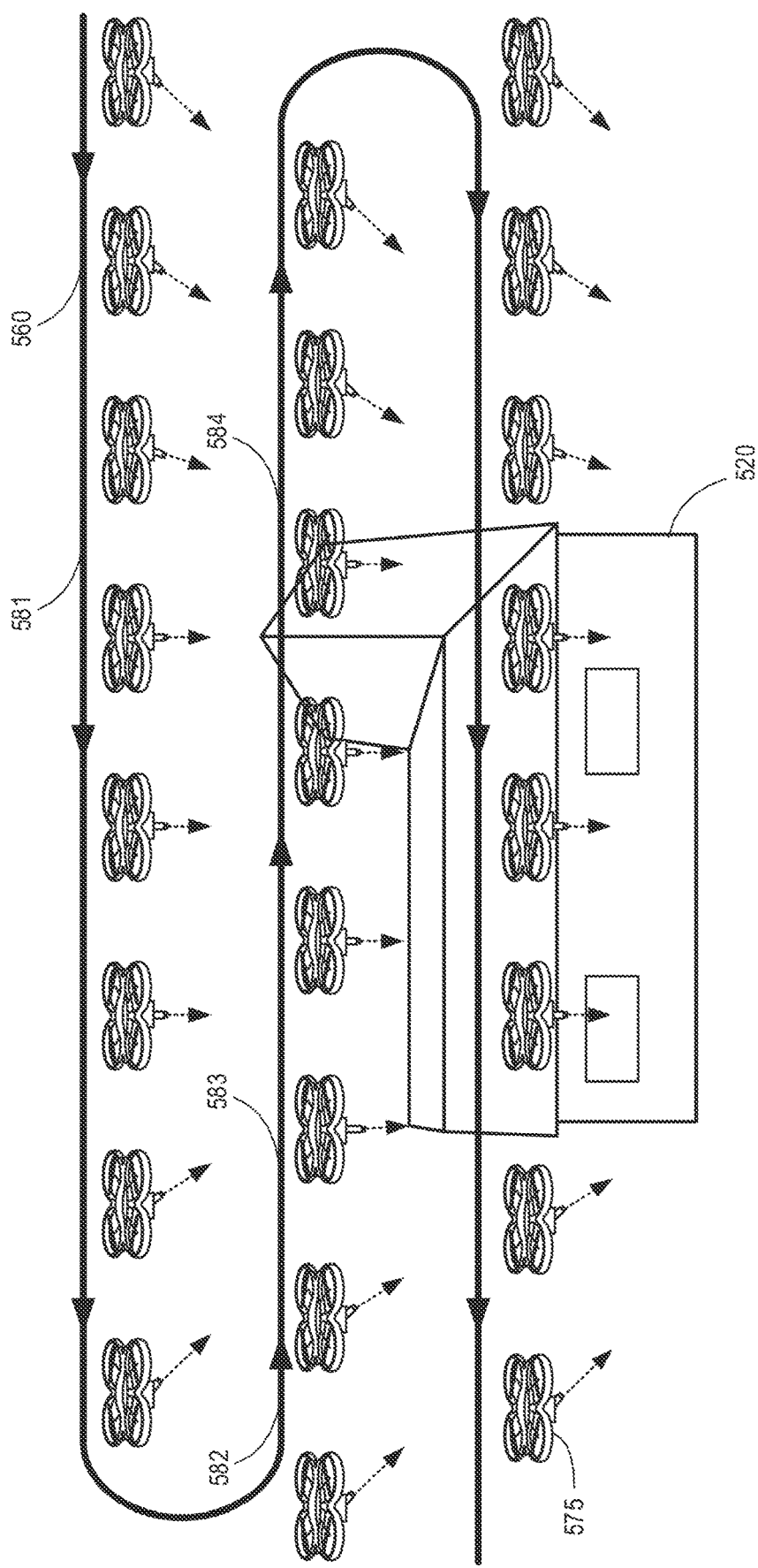
FIG. 5C illustrates a boustrophedonic flight pattern that includes tilting a camera to a rearward position during portions of each pass over a structure to capture additional obliques images of the structure, according to one embodiment.

FIG. 5C illustrates an alternative embodiment in which the camera of the UAV can tilt to a rearward facing position. As illustrated, the camera of the UAV 575 is angled upward (toward the structure 520) as it approaches, at 560, the structure 520. As it approaches, the camera transitions to a downward angle as it passes over the structure (e.g., as it passes over a middle of the structure or as it begins to pass over a portion of the structure). As the UAV 575 passes the structure 520, the camera is tilted to a rearward facing angle to continue to capture images of the structure at various angles as the UAV gets farther away from the structure.

In some embodiments, the camera may also be able to rotate left and right to allow angled images of the structure 520 during flight passes that are not over the top of the structure 520. The same pattern of camera tilting (and/or rotating) can be performed for each pass of the boustrophedonic flight pattern to capture images of the structure 520 at various angles during a continuous boustrophedonic flight pattern, or a combination of multiple boustrophedonic flight patterns at angles relative to one another as described herein.

Figure 6:
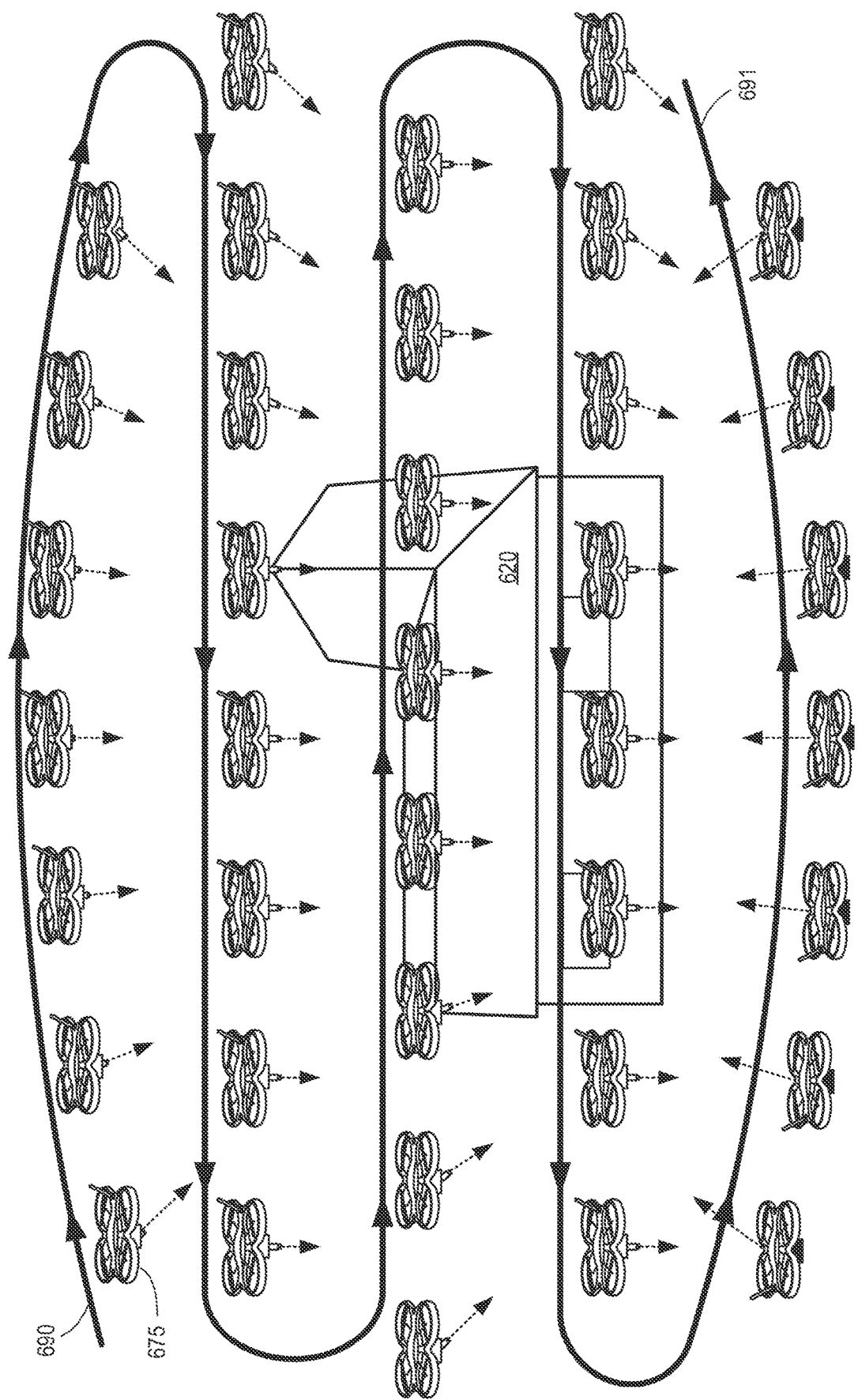
FIG. 6 illustrates a first boustrophedonic flight pattern of a crisscross flight pattern showing example camera angles for integrated oblique image capture during the crisscross flight pattern using rounded structure-facing end passes, according to one embodiment.

FIG. 6 illustrates a first boustrophedonic flight pattern of a crisscross flight pattern showing example camera angles of a UAV 675 for integrated oblique image capture during the crisscross flight pattern using rounded structure-facing end passes, according to one embodiment. As illustrated, a camera may be rotated on the UAV 675 during first and second rounded structure-facing end passes 690 and 691, respectively. In other embodiments, the camera may not be able to rotate or rotation of the UAV may be undesirable due to, for example, decreased visibility from landing gear of the UAV. In such instances, the UAV 675 may rotate and the camera may be angled upward toward the structure 620. The UAV 675 may then travel sideways (strafing) and backward/forwards to complete the rounded structure-facing end passes 690 and 691 of the boustrophedonic flight pattern. As further illustrated, during each of the other, non-end passes of the UAV 676, the camera may be angled forward/upward toward the structure on approach and then transition to downward once it is over the structure 675 and until the end of each pass (as described in conjunction with FIG. 5).

Figure 7:
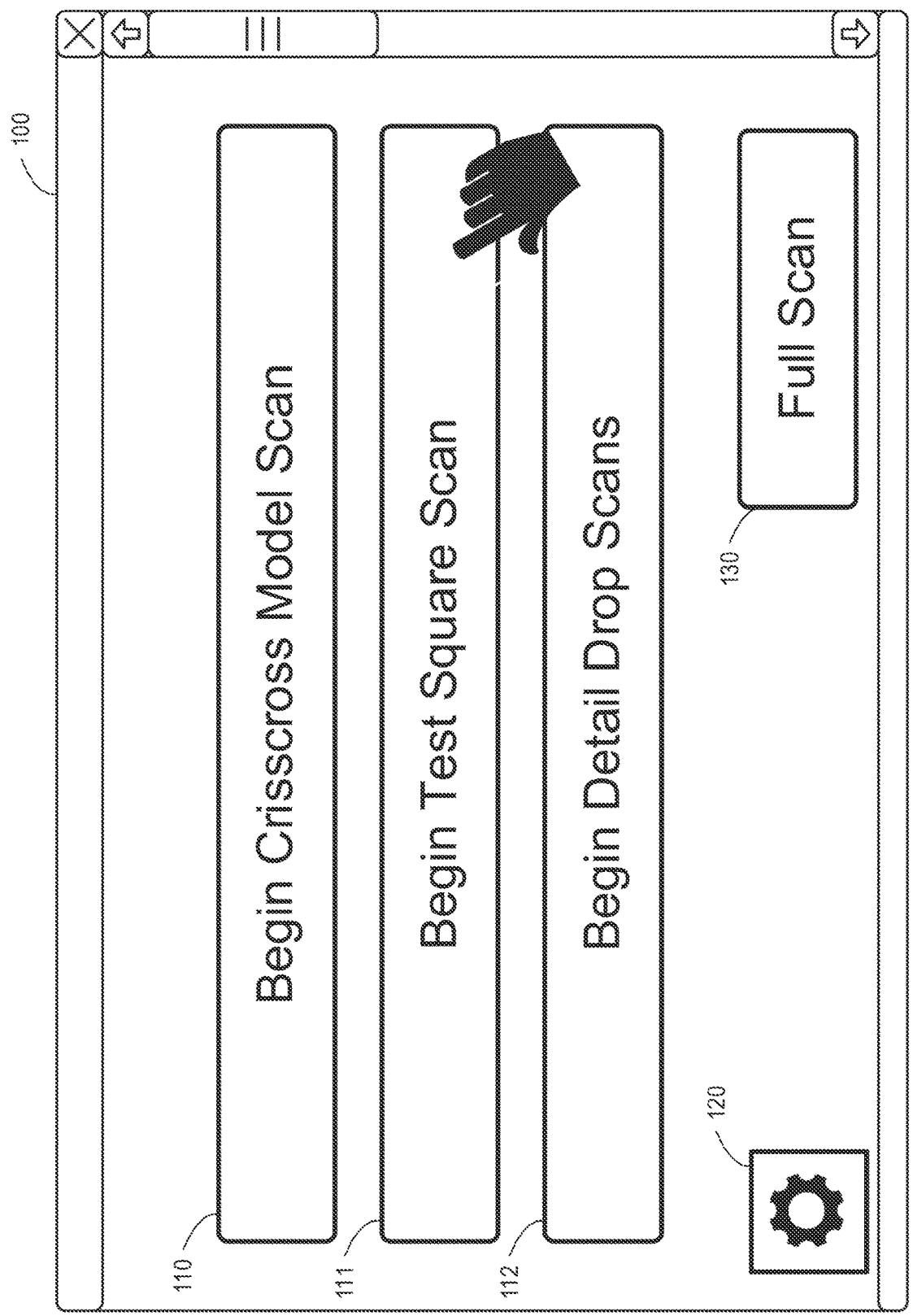
FIG. 7 illustrates an example of the user interface of FIG. 1A in which the test square scan is selected via the electronic computing device.

FIG. 7 illustrates an example of the user interface 100 of FIG. 1A in which the test square scan 111 is selected via the electronic computing device. In some embodiments, as described in conjunction with FIG. 1B, the test square scan 111 may be integral to or performed during the crisscross model scan 110.

Figure 8:
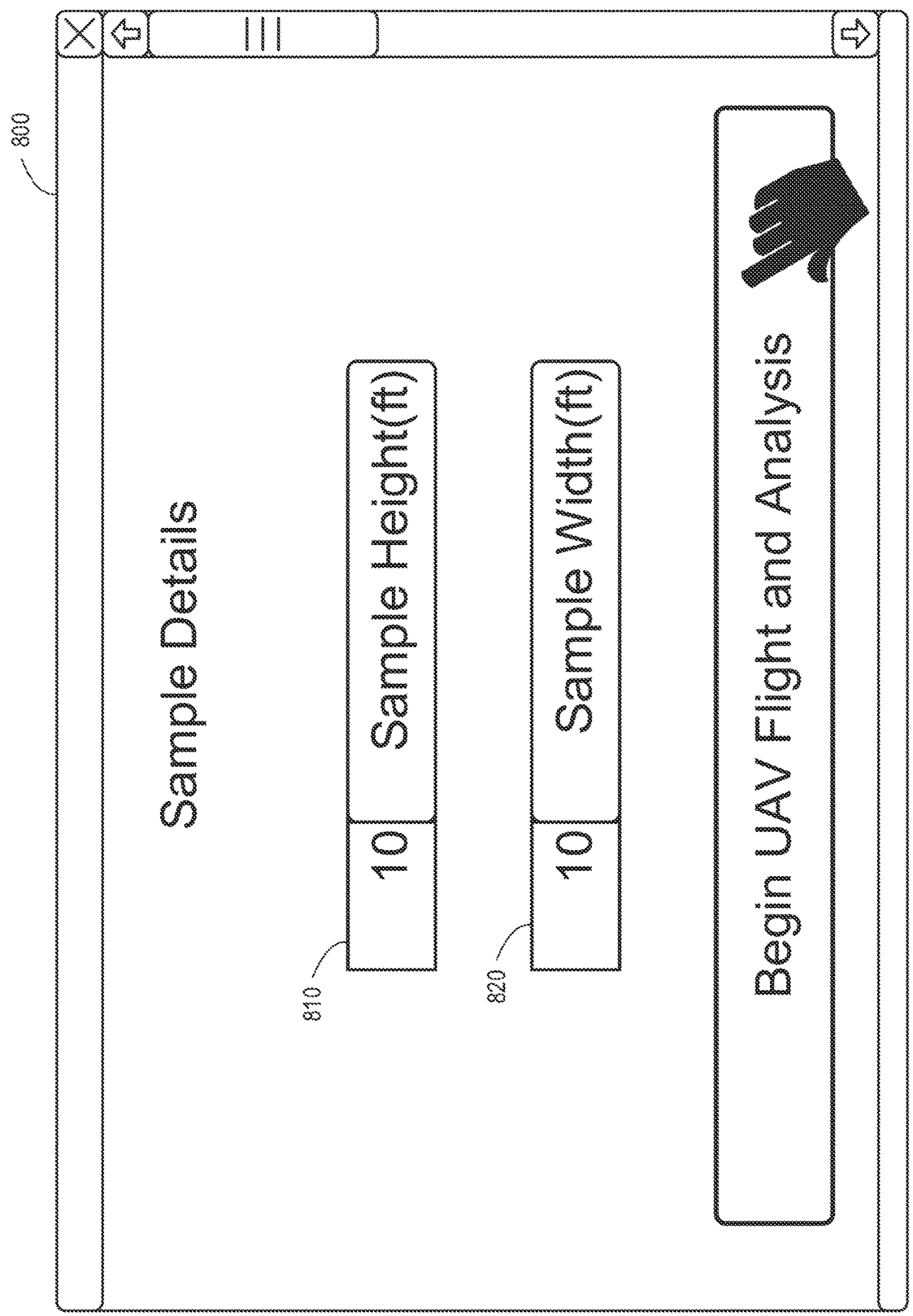
FIG. 8 illustrates an example of a user interface for initiating a customized UAV roof analysis from an electronic computing device, according to one embodiment.

FIG. 8 illustrates an example of a user interface 800 for initiating a UAV roof analysis from an electronic computing device, according to one embodiment. As illustrated, a user interface may allow an operator (e.g., an owner or agent, representative, contractor, or employee of a company) to select a sample size for patch scans and begin a UAV flight and analysis. For example, the operator may select a height 810 and/or width 820 setting. In some embodiments, the setting may be a total square footage setting instead of a height/width. In other embodiments, the sample dimensions may be a fixed aspect ratio, such that only one setting need be input (e.g., a square footage, a height, or a width.

In various embodiments, the sample size selection may correspond to a patch scan region with defined dimensions that are accepted by an industry standard. While the illustrated embodiment allows for a rectangular selection based on width and height, a wide variety of alternatives are possible. For instance, in one embodiment the selection may simply be a number "patches" per face of the roof, where each patch conforms to a standard size. In another embodiment, no selection may be available at all as the UAV may simply perform a standardized patch scan. Alternatively, each face of the roof may be considered its own patch region with unique dimensions.

As an example, the International Association of Certified Home Inspectors requires that a 10'×10' square section be used when possible with corners marked in chalk and damage points circled within the 100-square-foot region. Accordingly, to conform with the standard, in one embodiment the UAV system may digitally mark (e.g., overlay markings) on a 10'×10' section of the roof and digitally annotate (e.g., overlay markings on) each damage point therein.

Figure 9A:
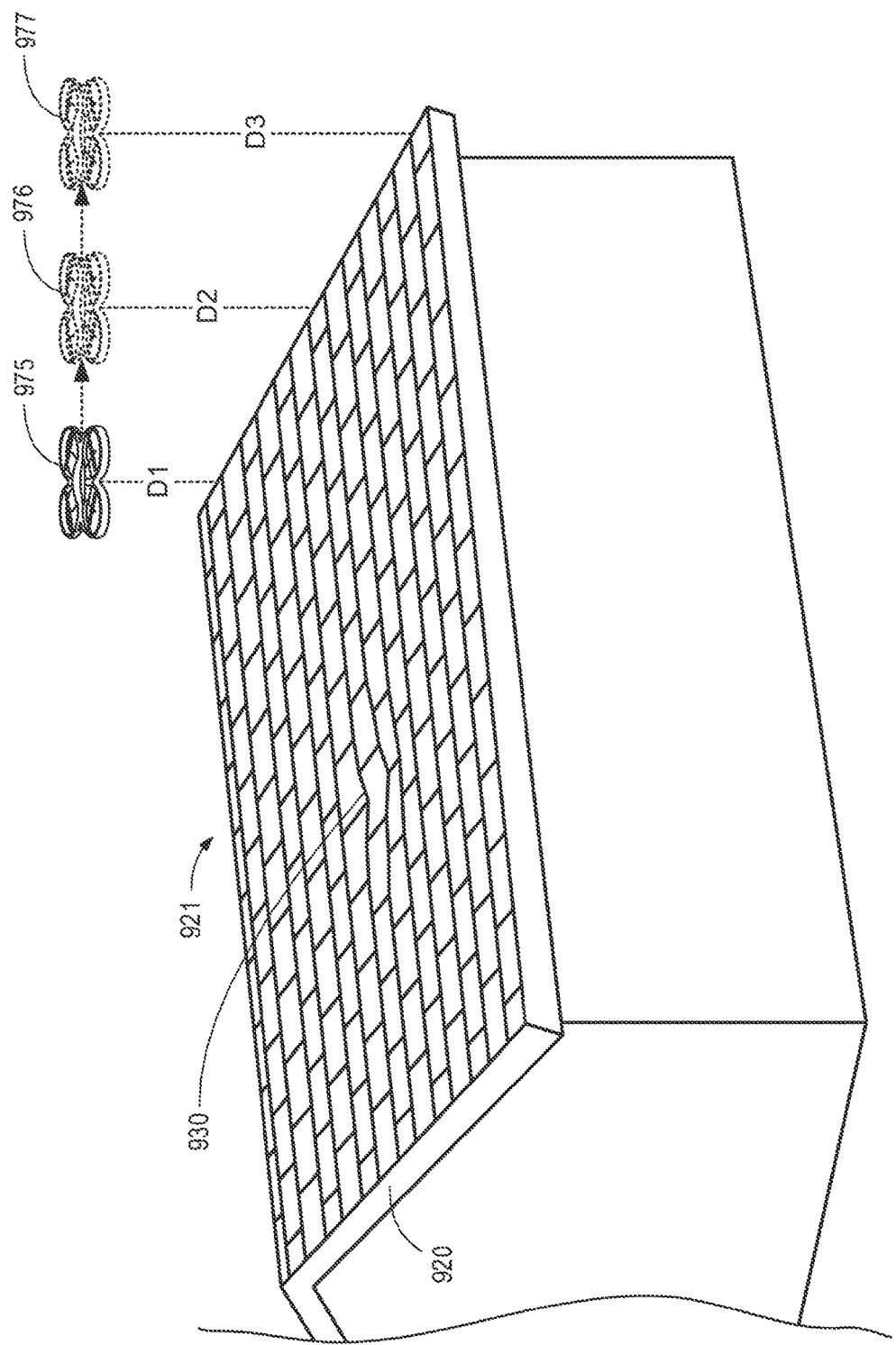
FIG. 9A illustrates a UAV determining a pitch of a roof, according to one embodiment.

FIG. 9A illustrates a UAV determining a pitch 921 of a roof 920 of a structure. The UAV 975 may capture three or more images of the roof: a first image at a first horizontal displacement location 975, a second image at a second horizontal displacement location 976, and a third image at a third horizontal displacement location 977. The UAV may use these images along with associated metadata, including proximity data, to determine the pitch 921 of the roof.

The UAV may also detect inconsistencies 930, such as a depression or bulge, in the shingles on the roof. The inconsistencies 930 may be a sign of damage to the roof. The UAV may mark the inconsistency 930 as a portion of interest for a subsequent patch scan analysis.

In various embodiments, the UAV 975 includes a propulsion system to move the UAV 975 from a first aerial location to a second aerial location relative to a structure. Movements may be horizontal, vertical, and/or a combination thereof. Lateral movements and rotation may also be possible. As previously described, the UAV may include one or more sensors that can be used, or possibly are specifically configured to determine distances to objects, such as the roof 920. The UAV may determine a distance to a roof at a first aerial location. The UAV may then move to a second aerial location along a movement vector that includes one or more directional components (e.g., up, down, left, right, back, or forward, which could be more generally described as vertical, horizontal, or lateral, or even described using an X, Y, and Z coordinate system). A distance to the roof may be calculated at the second aerial location. A pitch of the roof may be calculated (e.g., geometrically) based on the distance measurements at the first and second locations and at least one of the components of the movement vector.

Figure 9B:
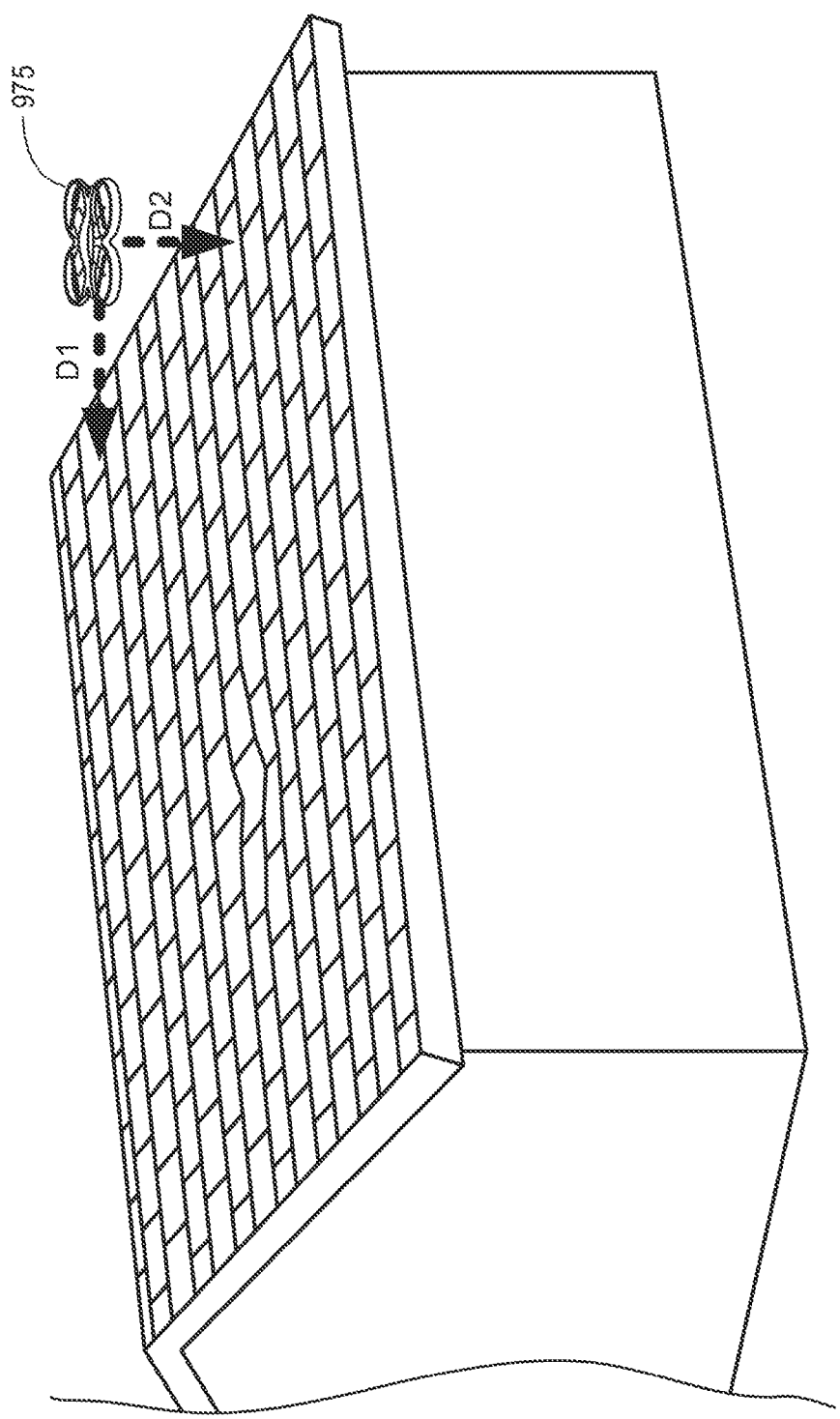
FIG. 9B illustrates a UAV determining a pitch of a roof, according to an alternative embodiment.

FIG. 9B illustrates a UAV 975 in a stationary location with forward and downward distance measurement sensors used to determine the pitch of the roof from a single location. Additional examples of pitch calculations and uses thereof are described in U.S. patent application Ser. No. 15/710,221 filed on Sep. 20, 2017, titled "Systems and Methods for Autonomous Perpendicular Imaging of Test Squares," which application is hereby incorporated by reference in its entirety.

Figure 10:
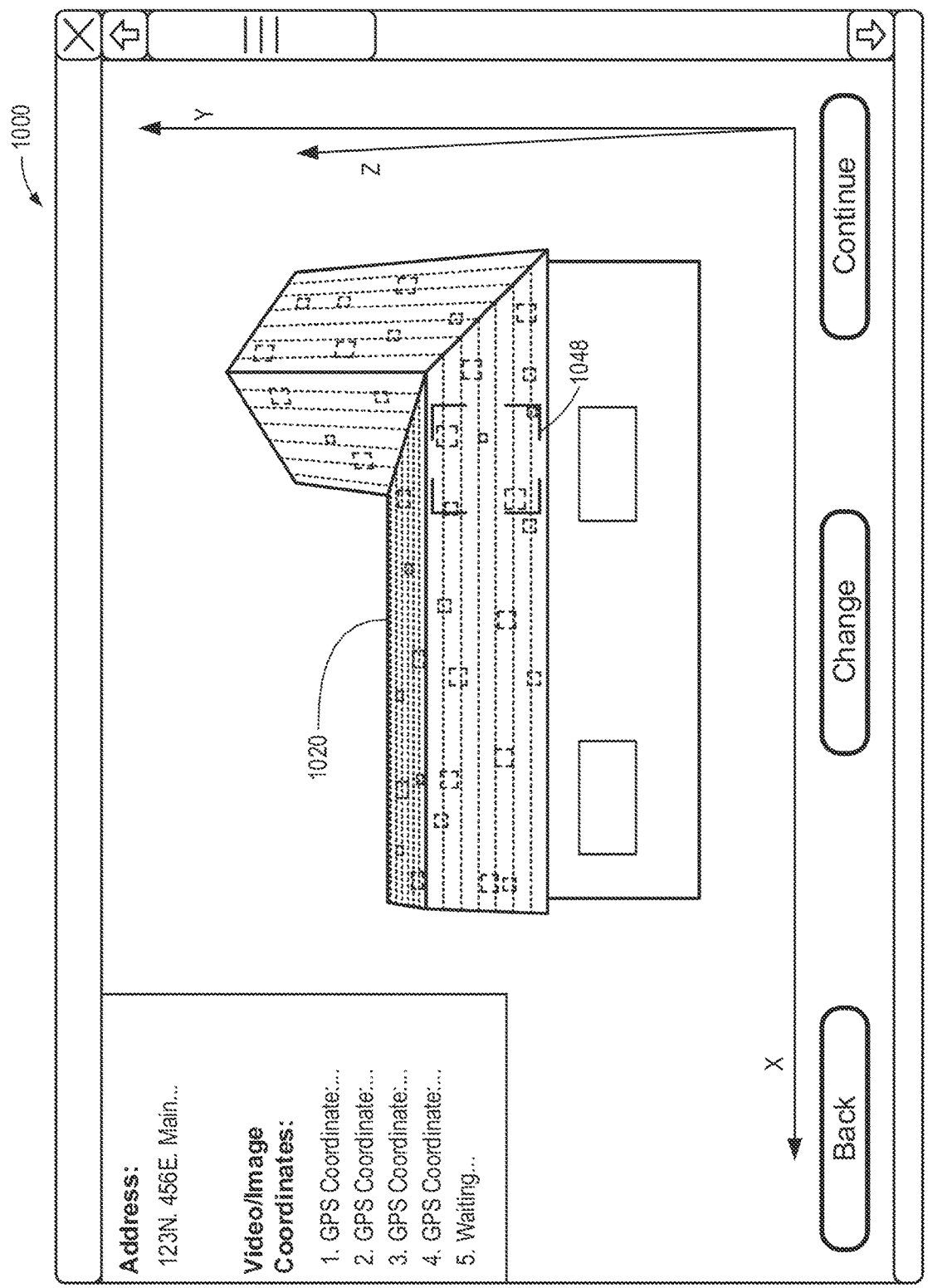
FIG. 10 illustrates a three-dimensional model of a roof displayed on an electronic computing device produced using imaging data collected by a UAV, including one or more patch scan analyses, according to various embodiments.

FIG. 10 illustrates a three-dimension model 1020 that may be developed using data gathered during one or more scans, such as the boustrophedonic scans shown in any one or more of FIGS. 2A-6. Specifically, the three-dimensional model 1020 may be created using images gathered during a crisscross boustrophedonic scan with rounded structure-facing end passes, as illustrated in FIG. 4C and FIG. 6. Alternatively, the three-dimensional model 1020 may be created using the crisscross boustrophedonic scan with multiple passes, where each pass includes a structure-facing approach in which the camera is angled upward toward the structure, as illustrated in FIG. 3 and FIG. 5.

The three-dimensional model 1020 may be displayed 1000 on an operator's electronic computing device for display to an owner or another interested individual. The three-dimensional model 1020 may be used to explain the extent of damage and or as evidence of the accuracy of the assessment. For example, patch scans 1048 of a predetermined size, shape, location, etc. that conform to one or more industry specifications may be displayed on the roof of the three-dimensional model 1020. Damage marks and/or patch scan boundaries may be shown by annotating actual images. Alternatively, a digitally rendered model of the entire structure and/or roof may be developed that includes the damage marks and/or patch scan boundaries. In various embodiments, tapping, mousing-over, or otherwise selecting a portion of the roof may display the damage marks more clearly, such as with highlighting or color-coded effects based on severity or overall damage status of a patch scan region. Similarly, patch scan boundaries may be selectively displayed as overlays with color coding to show damage severity.

In some embodiments, the UAV itself does the image processing to generate the patch scan regions with identified damage points, associated boundaries, and overlay markings. In other embodiments, the UAV may upload the scan data to a cloud-based analysis system and/or to the operator's electronic computing device for processing. Thus, in some embodiments, the displayed three-dimensional model 1020 may include actual images of the rooftop and, when a region is selected, a patch scan region with a predefined size and/or shape is overlaid on the image and damage marks within the overlaid scan patch are identified. In some embodiments, the system may perform an objective analysis of each damage mark to determine the extent of the damage. Color-coded annotations may be used to visually illustrate the extent of the damage.

As a specific example, a patch scan region that shows little or no damage may be outlined in green. A patch scan region with medium damage may be outlined in yellow, while a heavily damaged region may be outlined in red. Similar codings may be used for each individual damage points. Damage assessments may conform to industry practices and standards for a given applicable administrative body.

Figure 11:
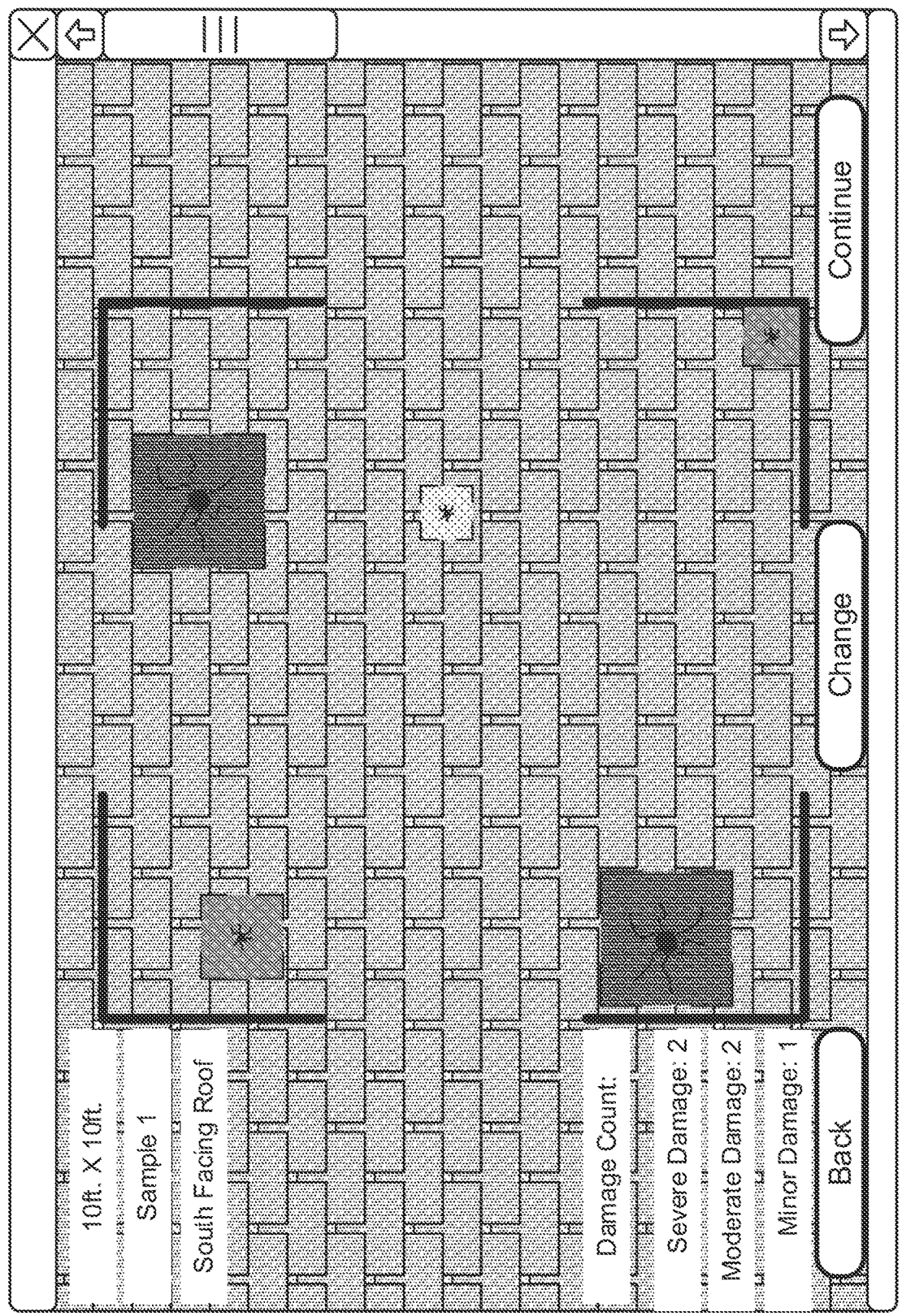
FIG. 11 illustrates a close-up view of a patch scan analysis on an electronic computing device, according to one embodiment.

FIG. 11 illustrates a close-up view of a patch scan analysis on an electronic computing device, according to one embodiment. An operator may select a patch scan region in the three-dimensional visualization shown in FIG. 10. In response to the selection, the damage visualization software may present a zoomed in view of the patch scan region outlined with black lines in the corners. Each damage mark may be marked and annotated based on objective severity. Color coding may be used. Information regarding the sample size, location, and severity may be textually communicated as well.

Figure 12:
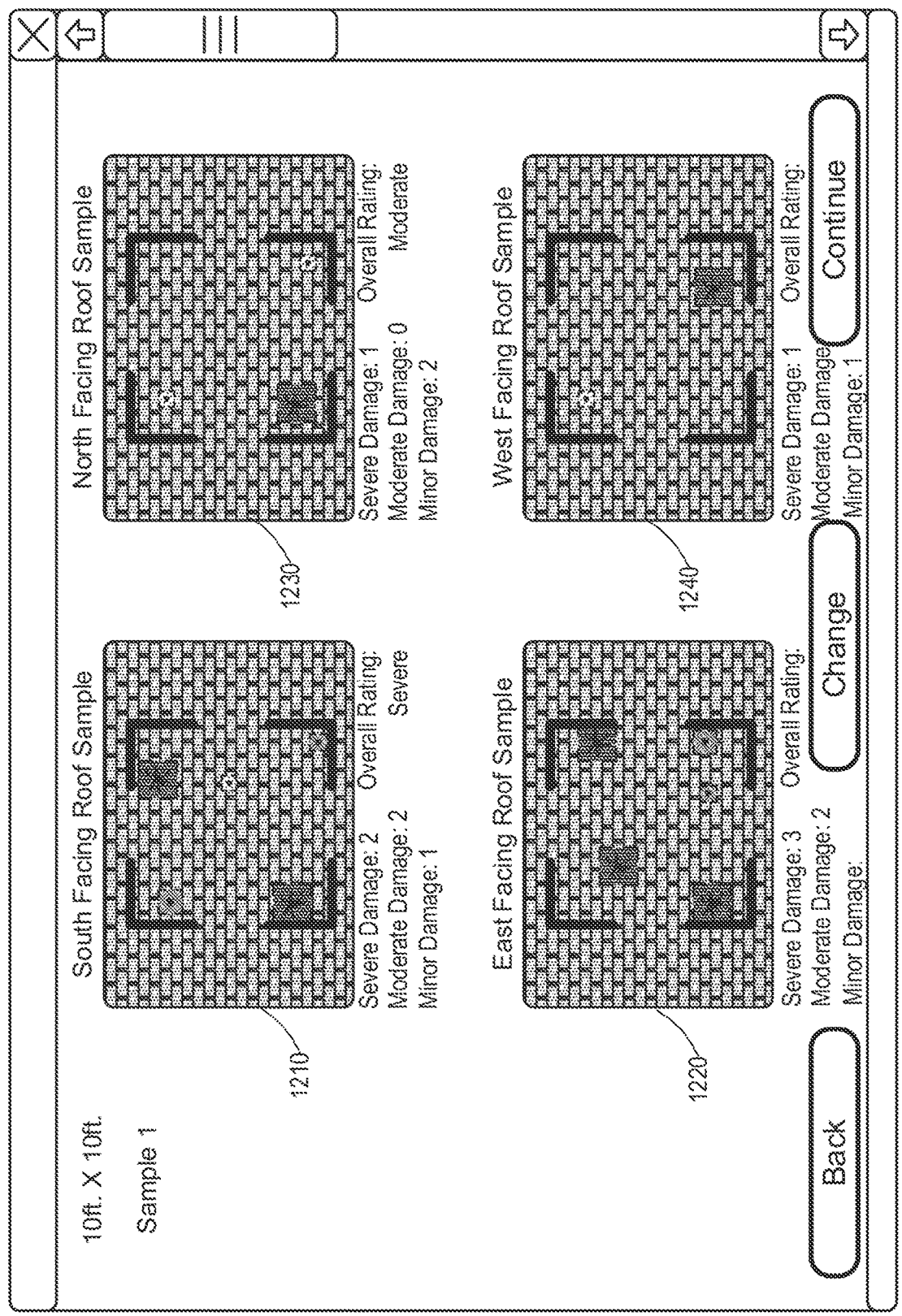
FIG. 12 illustrates close-up views of patch scan analyses for each face of a roof on an electronic computing device, according to one embodiment.

FIG. 12 illustrates close-up views of patch scan analyses 1210, 1220, 1230, and 1240 for each face of a roof on an electronic computing device, according to one embodiment. As per the illustrated example, each patch scan region 1210-1240 may be outlined with black lines in the corners and damage marks highlighted and/or color-coded based on severity. Textual information for each patch scan region 1210-1240 may describe the number of severe damage locations, the number of moderate damage locations, and the number of minor damage locations. The damage visualization software may also compute and/or display an overall damage severity.

Figure 13:
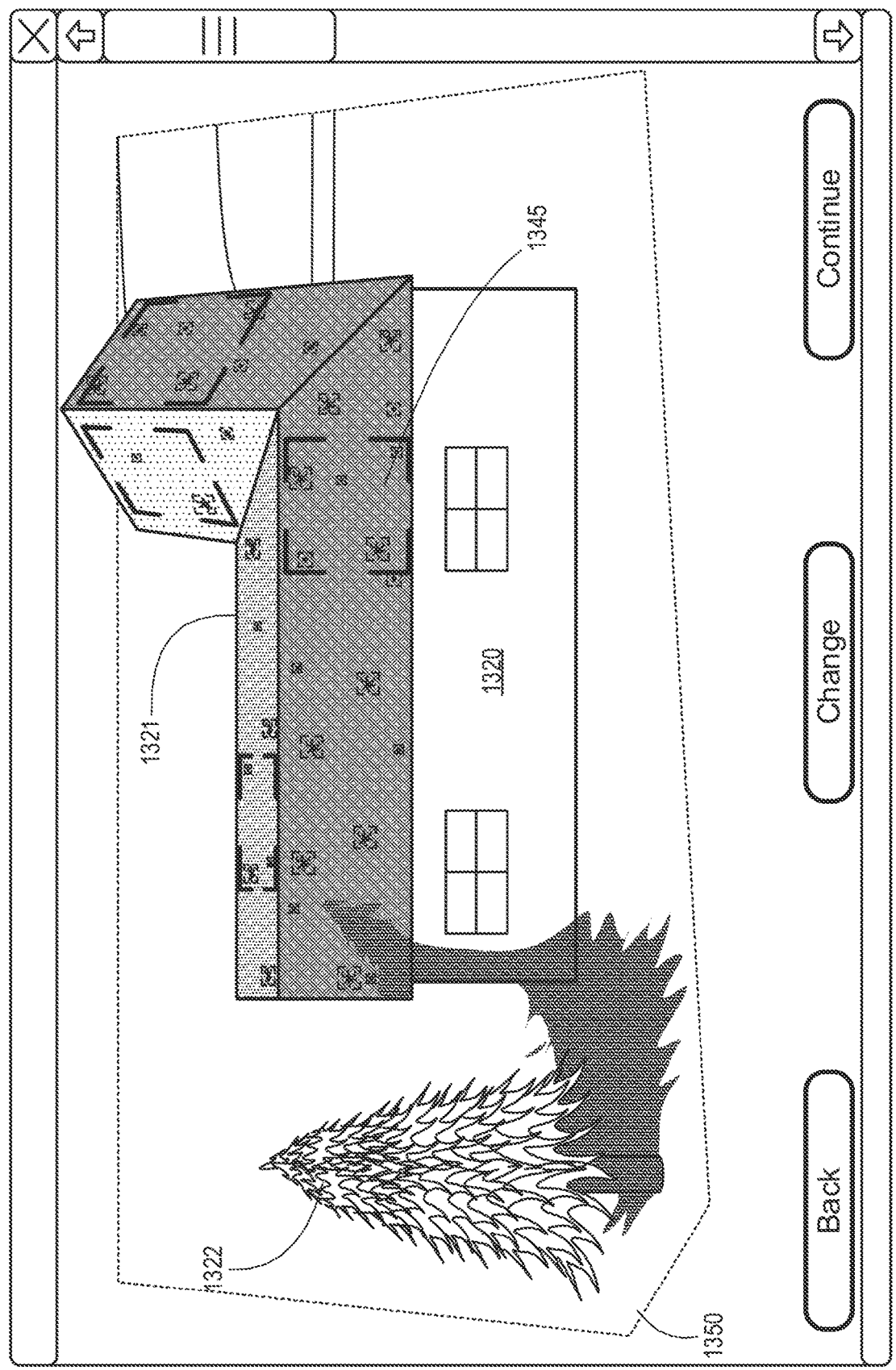
FIG. 13 illustrates a three-dimensional rendering of a house with annotated damage markers and patch scan region outlines, according to various embodiments.

FIG. 13 illustrates a three-dimensional rendering of a house 920 displayed on an operator's computing device with annotated damage markers and patch analysis locations 1345 on the roof 1321 thereof. The displayed rending may include other objects, such as a tree 1322 and boundary markers 1350 to provide contextual information for understanding the images and damage illustrated.

Figure 14:
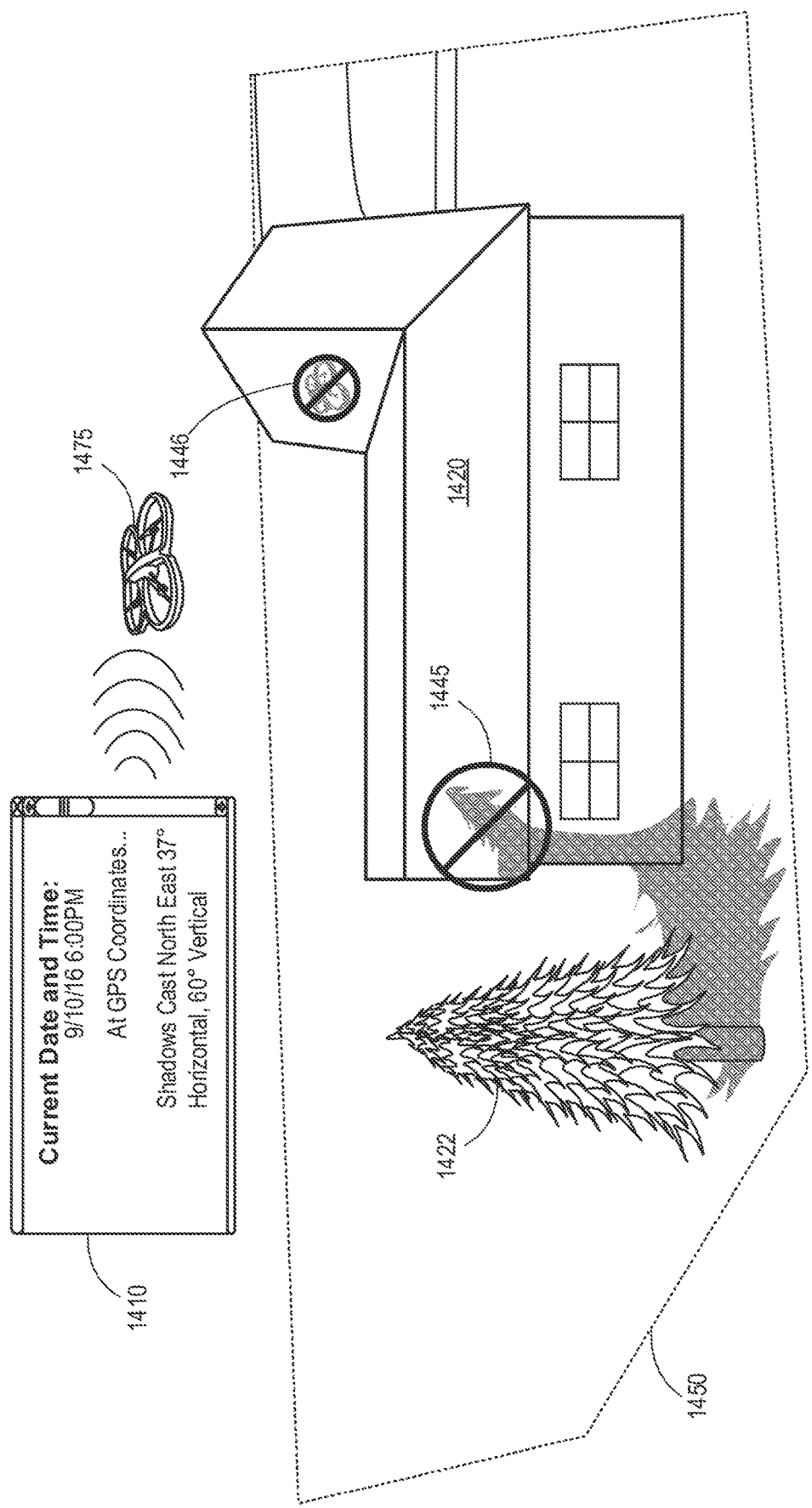
FIG. 14 illustrates a UAV using the date and time to identify and/or eliminate shadows in image captures, according to one embodiment.

FIG. 14 illustrates a UAV roof analysis system using the date and time 1410 to identify and/or optionally eliminate shadows in image captures. As shown a UAV 1475 may receive the current date and time 1410. The UAV 1475 may determine a shadow 1445 of obstacles 1422 on a site 1450. The UAV 1475 may refrain from taking images of the portion of a roof 920 covered by the shadow 1445 of the obstacle 1422, annotate or otherwise identify shadow 1445, and/or take additional images at a subsequent time when the shadow 1445 has moved. Further, the UAV 1475 may determine a time when the shadow 1445 will move away from the roof 1420. The UAV roof analysis system using the date may also adjust the camera angle on the UAV 1475 to avoid shadows 1446 from the UAV 1475.

Figure 15:
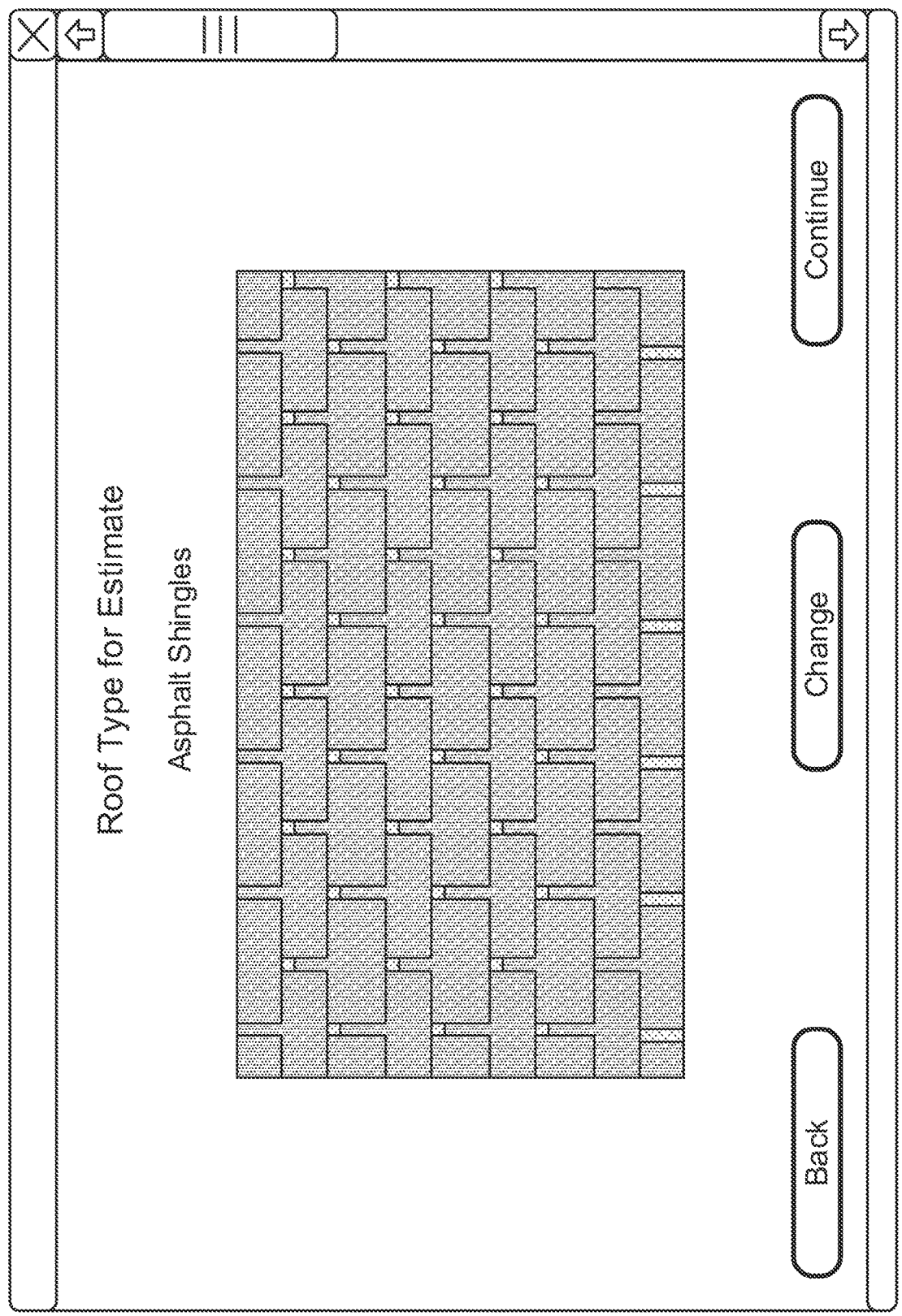
FIG. 15 illustrates a roof-type analysis result displayed on an electronic computing device, according to one embodiment.

FIG. 15 illustrates a roof-type analysis result displaying a detected shingle type as being "asphalt shingles" along with an image. An agent or homeowner can verify the accuracy in some embodiments.

FIG. 16 illustrates an estimate of repairs based on patch analyses and a roof-type analysis presented on an electronic computing device, according to various embodiments. In the illustrated embodiment, the roof is identified as being constructed as asphalt shingles. The total square footage is measured by the UAV as being 1700 square feet. Thirty-three damage points are identified on four roof faces. Three of the four roof faces are noted as requiring replacement. In total, 1275 square feet are recommended for replacement and 300 square feet are recommended for repair. The average damage is considered moderate and a cost per square foot for replacement is estimated at $7.00 per square foot for a total cost of just under $9,000.

According to various embodiments, a remediation determination system may evaluate the severity of damage and the number of damage points on each face of a roof and assign a remediation status thereto. For example, faces of the roof may be assigned a "replace" status, a "repair" status, or "no remediation is needed" status. The roof faces may be assigned a remediation status based on a patch region analysis with a patch have a defined dimension or based on a total number of damage points and severity rankings on each face.

Figure 17:
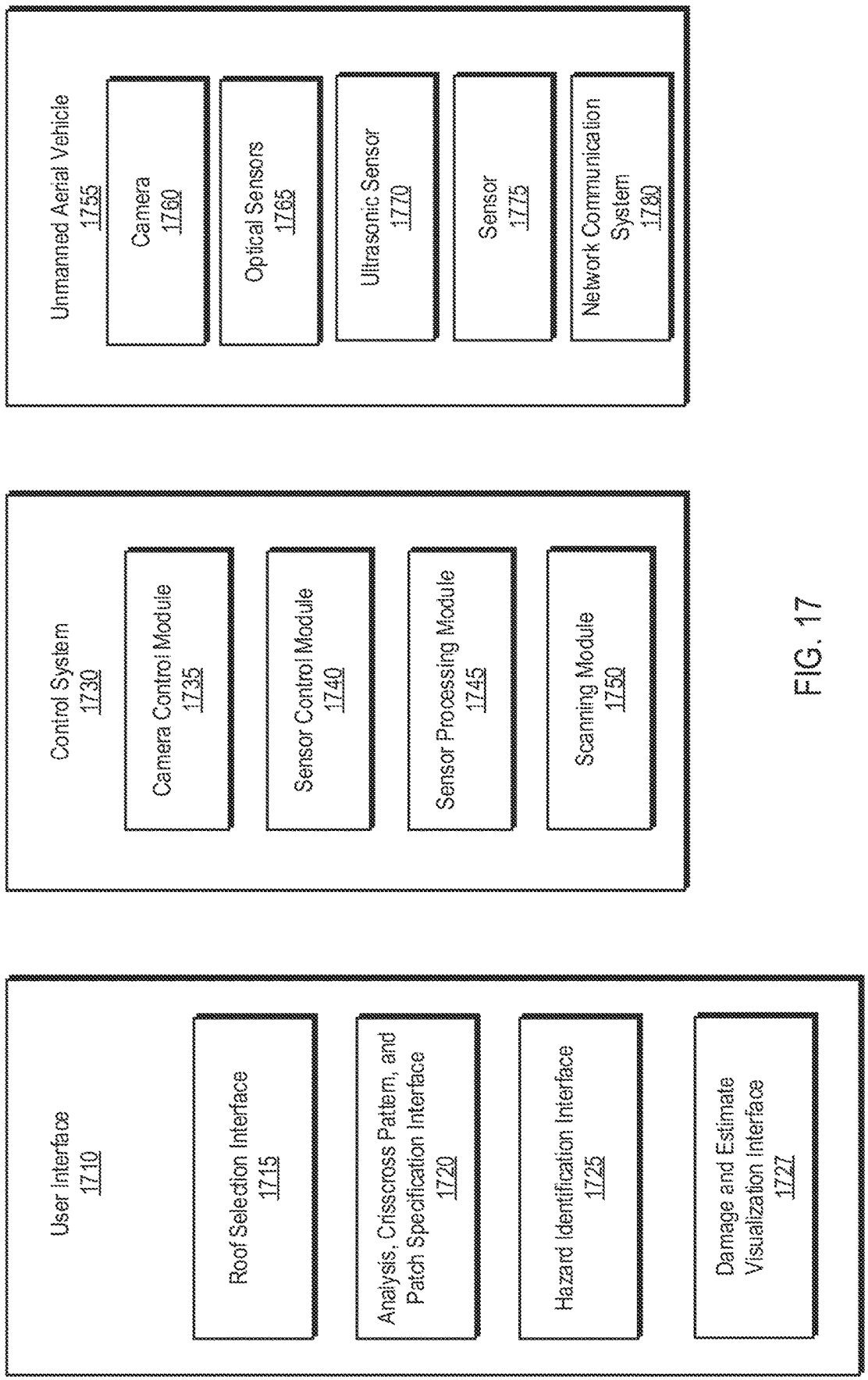
FIG. 17 illustrates a block diagram of a UAV roof analysis system for analyzing a roof and presenting the results of the analysis, according to one embodiment.

FIG. 17 illustrates a UAV roof analysis system for analyzing a structure, according to one embodiment. As illustrated, a user interface 1710 may include a roof selection interface 1715 to receive an electronic input from an operator or technician that identifies a roof t to be analyzed. The user interface 1710 may further include an interface 1720 to receive user input identifying a desired roof analysis and/or to allow a user to specify the type of patch scans or crisscross flight pattern to conduct. For example, patch scan may be specified with specific dimensions, shapes, sizes, etc. to conform to the requirements or standards set by a governing entity or applicable standard.

The user interface 1710 may additionally or optionally include a hazard identification interface 1725 allowing a user to identify one or more hazards proximate a structure or site identified using the roof selection interface 1715. A damage and estimate visualization interface 1727 allows an operator to visualize and/or present to an interested party a visual representation of a damage assessment. Estimates for repair and/or replacement (i.e. remediation) may also be prepared and presented via the damage and estimate visualization interface 1727.

A control system 1730 may be onboard a UAV 1755, may be remote (e.g., cloud-based), and/or integrated into the computing device running the user interface 1710. The control system 1730 may provide instructions to the UAV 1755 to cause it to conduct an assessment and roof analysis. The control system 1730 may include a camera control module 1735, other sensor control modules 1740, image and/or sensor processing modules 1745, and/or scanning modules 1750 to implement boustrophedonic, crisscross, and/or patch scans. The UAV 1755 itself may include one or more cameras 1760 that may be used simultaneously or successively and/or may require manual swapping, one or more optical sensors 1765, ultrasonic sensors 1770, other sensors 1775, and one or more network communication systems 1780. FIG. 17 is merely representative of one example embodiment, and numerous variations and combinations are possible to implement the systems and methods described herein.

Figure 18:
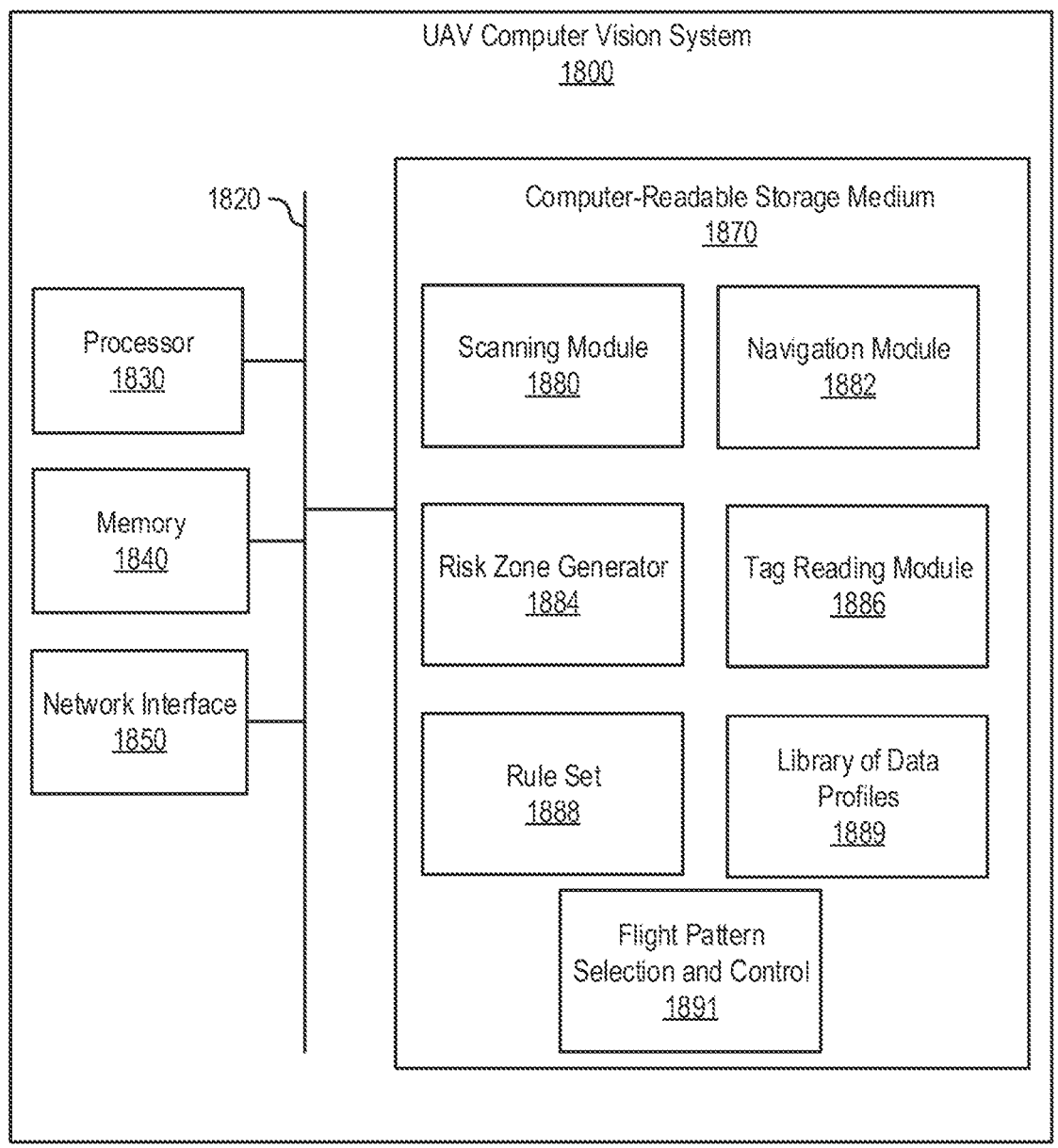
FIG. 18 illustrates a system for roof analysis including a library of data profiles for computer vision matching, according to one embodiment.

FIG. 18 illustrates a system for roof analysis including a library of data profiles 1889 for computer vision matching, according to one embodiment. The UAV computer vision system 1800 may be onboard the aerial vehicle, cloud-based, or a combination thereof. The system 1800 may include a processor 1830, memory 1840 and a network interface 1850 connected to a computer-readable storage medium 1870 via a bus 1820.

A scanning module 1880 may incorporate or control any of the systems described herein and implement any of the methods described herein. A navigation module 1882 may utilize navigation sensors of the UAV and include various control mechanisms for navigating the UAV to perform scans, including boustrophedonic, loop, and/or micro scans with patch scan region analysis.

The risk zone generator 1884 may generate a risk zone associated with the property (e.g., overhead power lines, vehicle, structure, tower, bridge, road, residence, commercial building, etc.) within which the UAV may navigate while performing one or more types of scanning operations. The risk zone generator 1884 may tag portions of the risk zone with scan-relevant tags and obstacle tags to aid the scanning of the property and/or avoid obstacles during navigation.

During micro scans and patch scan analyses, a tag reading module 1886 may receive information from tags based on the location of the UAV within the risk zone and relative to the property. The tag reading module 1886 may receive scan-relevant or navigation-relevant information. The information therein may be used to query a rule set 1888. The rule set 1888 may modify a navigation pattern, flight direction, scan type, scan details, or other action to be taken or being taken by the UAV in response to a rule set's interpretation of information provided by a tag read by the tag reading module 1886.

The UAV computer vision system 1800 may also access a library of data profiles 1889. Scan data captured by the UAV of any type of sensor may be compared and matched with data profiles within the library of data profiles 1889. In response to the UAV computer vision system 1800 identifying a match within the library of data profiles 1889, the rule set 1888 may dictate a modification to the scanning or navigation pattern. A flight pattern selection and control module may allow for the selection of a flight pattern and provide instructions (in real-time or via an upload/download) for implementing a specific flight pattern and scan (e.g., in concert with scanning module 1880.

For example, a crisscross boustrophedonic flight pattern may be selected. An operator may select the number of boustrophedonic flight patterns for the crisscross boustrophedonic flight patterns (e.g., 2, 3, 4, . . . ) and/or the relative angles (e.g., 90 degrees, 120 degrees, 22.5 degrees, etc.) of each of the boustrophedonic flight pattern in the crisscross flight pattern. Furthermore, the flight pattern selection and control module 1891 may allow for the selection of structure-facing end passes in one or more the boustrophedonic flight patterns and, optionally, rounded structure-facing end passes in one or more of the boustrophedonic flight patterns.

Figure 19:
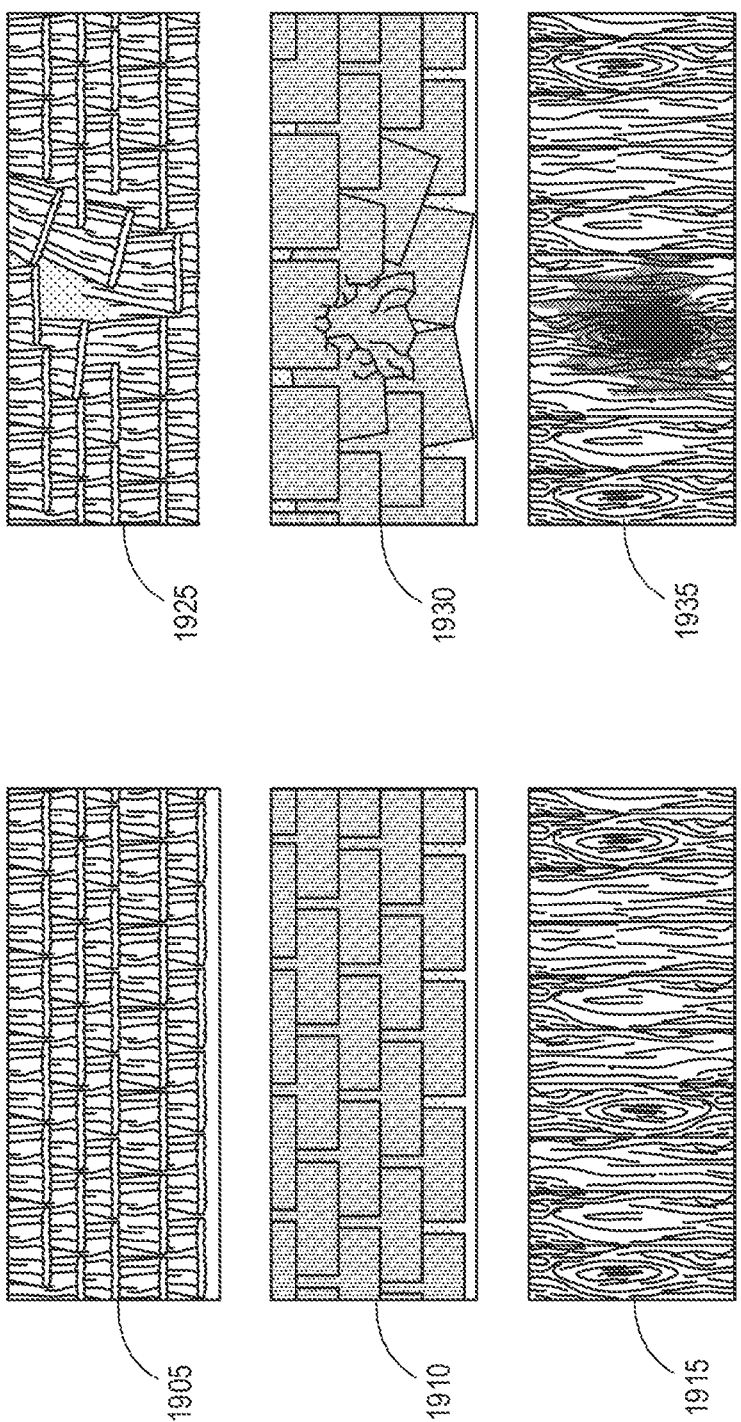
FIG. 19 illustrates examples of possible library images of data profiles, according to one embodiment.

FIG. 19 illustrates examples of possible library images of data profiles 1905-1935, according to one embodiment. Many examples of data profiles may not be optical and are not illustrated in the drawings. For example, infrared data profiles and ultrasound profiles may be used instead of or in addition to optical data profiles. For example, a false color representation of an infrared scan may be used to show water damage to a roof. The UAV system may capture sensor data and identify a material by comparing the captured images with data profiles within a library of data profiles. For example, computer vision may be used to identify a roof as cedar shakes 1905, asphalt shingles 1910, or wood 1915.

Once a material is identified and scanning continues, subsequent images can be compared with other data profiles to identify defects or other characteristics. For example, windblown cedar shakes 1925 may be identified through computer vision techniques. Hail pops in asphalt shingles 1430 may be identified by matching captured image data with stored data profiles. Similarly, defects in wood 1935 may be identified by matching captured sensor data with library data profiles.

This disclosure has been made with reference to various embodiments, including the best mode. However, those skilled in the art will recognize that changes and modifications may be made to the embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

What is claimed is:

1. An unmanned autonomous vehicle (UAV) assessment system for scanning at least a portion of a structure, comprising:
- at least one sensor to capture scan data of at least a portion of walls and a roof of a structure at multiple locations during an implemented flight pattern; and
- a flight pattern control system to cause the UAV to navigate a crisscross boustrophedonic flight pattern relative to the structure during which the at least one sensor is used to capture the scan data, the crisscross boustrophedonic flight pattern comprising at least:
  - a first boustrophedonic flight pattern comprising a first set of passes over the structure at a first orientation to capture a first set of scan data, and
  - a second boustrophedonic flight pattern comprising a second set of passes over the structure at a second orientation to capture a second set of scan data that is combinable with the first set of scan data for rendering a model of the structure with at least a portion of the walls and roof of the structure, wherein the first orientation of the first set of passes of the first boustrophedonic flight pattern are at an angle relative to the second orientation of the second set of passes of the second boustrophedonic flight pattern.

2. The UAV assessment system of claim 1, wherein the first orientation of the first set of passes of the first boustrophedonic flight pattern is at a substantially 90-degree angle relative to the second orientation of the second set of passes of the second boustrophedonic flight pattern.

3. The UAV assessment system of claim 1, wherein the first orientation of the first set of passes is defined as a direction shared by at least a portion of each of a majority of the first set of passes, and wherein the second orientation of the second set of passes is defined as a direction shared by at least a portion of a majority of the second set of passes.

4. The UAV assessment system of claim 1, wherein each pass of the first set of passes of the first boustrophedonic flight pattern is connected to a neighboring pass via a rounded pass-offset portion.

5. The UAV assessment system of claim 1, wherein each pass of the first set of passes of the first boustrophedonic flight pattern is connected to a neighboring pass via a squared pass-offset portion.

6. The UAV assessment system of claim 1, wherein each pass of the first set of passes of the first boustrophedonic flight pattern is connected to a neighboring pass via an angled pass-offset portion.

7. The UAV assessment system of claim 1, wherein each of the first set of scan data and the second set of scan data comprises infrared images captured by an infrared light camera.

8. The UAV assessment system of claim 1, wherein the at least one sensor comprises a camera to capture visible-light images.

9. An unmanned autonomous vehicle (UAV) assessment system for scanning a structure, comprising:
- at least one sensor to capture scan data of at least a roof of a structure at multiple locations during an implemented flight pattern; and
- a flight pattern control system to cause the UAV to navigate a crisscross boustrophedonic flight pattern relative to the entire structure during which the at least one sensor is used to capture the scan data, the crisscross boustrophedonic flight pattern comprising at least:
  - a first boustrophedonic flight pattern comprising a first set of passes over the structure at a first orientation to capture a first set of scan data sufficient for three-dimensional model rendering of at least the roof of the structure, and
  - a second boustrophedonic flight pattern comprising a second set of passes over the structure at a second orientation to capture a second set of scan data sufficient for three-dimensional model rendering of at least the roof of the structure, wherein the first orientation of the first set of passes of the first boustrophedonic flight pattern is at an angle relative to the second orientation of the second set of passes of the second boustrophedonic flight pattern.

10. The system of claim 9, wherein the first orientation of the first set of passes of the first boustrophedonic flight pattern is at an acute angle relative to the second orientation of the second set of passes of the second boustrophedonic flight pattern, such that the orientation of at least one set of passes is at a non-orthogonal angle relative to the exterior walls of the structure.

11. The system of claim 9, wherein the first orientation of the first set of passes of the first boustrophedonic flight pattern is at a substantially 90-degree angle relative to the second orientation of the second set of passes of the second boustrophedonic flight pattern.

12. The system of claim 9, wherein each of the first set of scan data and the second set of scan data comprises at least one of infrared images and visible light images.

\* \* \* \* \*